US012809287B2

(12) United States Patent
Takano et al.

(10) Patent No.: US 12,809,287 B2
(45) Date of Patent: Nov. 24, 2026

(54) EXPOSURE HEAD AND IMAGE FORMING APPARATUS

(71) Applicant: CANON KABUSHIKI KAISHA, Tokyo (JP)

(72) Inventors: Hiroki Takano, Saitama (JP); Ryo Nakanishi, Chiba (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 19/212,889

(22) Filed: May 20, 2025

(65) Prior Publication Data

US 2025/0370368 A1 Dec. 4, 2025

(30) Foreign Application Priority Data

May 28, 2024 (JP) ................................ 2024-086279

(51) Int. Cl.
*G03G 15/04* (2006.01)
*G03G 15/00* (2006.01)

(52) U.S. Cl.
CPC ... *G03G 15/04054* (2013.01); *G03G 15/0409* (2013.01); *G03G 15/80* (2013.01); *G03G 2215/0409* (2013.01); *G03G 2215/0456* (2013.01)

(58) Field of Classification Search
CPC ....... G03G 15/04036; G03G 15/04054; G03G 15/0409; G03G 15/043; G03G 15/0435; G03G 15/80; G03G 2215/0409; G03G 2215/0456
USPC ......................................................... 399/177
See application file for complete search history.

(56) References Cited

U.S. PATENT DOCUMENTS 11,429,034 B2 * 8/2022 Yagi ................ G03G 15/04054
12,253,810 B2 3/2025 Ishidate et al.

FOREIGN PATENT DOCUMENTS

JP 2023-154632 A 10/2023

OTHER PUBLICATIONS

U.S. Appl. No. 19/212,884, filed May 20, 2025, Nakanishi et al.

* cited by examiner

*Primary Examiner* — Hoan H Tran
(74) *Attorney, Agent, or Firm* — Venable LLP

(57) ABSTRACT

An exposure head includes a substrate assembly including a first light emitting chip, a second light emitting chip, and a substrate on which the first light emitting chip and the second light emitting chip are mounted, a lens array, a retaining member configured to retain the substrate assembly and the lens array, and a first adhesion portion. In a state where an area on the substrate where the end portion of the second light emitting chip in the main scanning direction and the end portion of the first light emitting chip in the main scanning direction overlap when viewed in the sub-scanning direction is referred to as a first area, the first adhesion portion is configured to adhere both end portions of the substrate assembly in the sub-scanning direction to the retaining member in the first area.

12 Claims, 20 Drawing Sheets

EXPOSURE HEAD AND IMAGE FORMING APPARATUS

BACKGROUND

Field of the Technology

The present disclosure relates to an exposure head and an image forming apparatus.

Description of the Related Art

Image forming apparatuses adopting an electrophotographic system are equipped with an exposing unit for irradiating a surface of a photosensitive drum with light and forming an electrostatic latent image thereon. An LED array-type exposure head is known as one type of exposing unit (Japanese Patent Application Laid-Open Publication No. 2023-154632). The LED array-type exposure head includes an LED chip in which a plurality of LEDs serving as light emitting elements are aligned in a main scanning direction, a substrate in which a plurality of LED chips are arranged in a staggered fashion in the main scanning direction, a lens array, and a casing retaining the substrate and the lens array. The lens array includes a plurality of lenses that are aligned in the main scanning direction, and through these lenses, light emitted from the LEDs on the LED chip are focused on the surface of the photosensitive drum. Each of the plurality of lenses has a light incident surface into which the light emitted from the LED enters and a light emission surface through which the light entering from the light incident surface is emitted.

The casing is formed to have a long shape in the main scanning direction and an approximately U-shaped cross-section, and in the casing are arranged the lens array and the substrate at upper and lower installation positions with a distance therebetween in a vertical direction. The lens array is attached to the casing by an adhesive such that the light emission surface of the lenses are exposed on the photosensitive drum side, and the substrate is attached to the casing by an adhesive such that the substrate opposes the light incident surface of the lenses.

SUMMARY

According to one aspect of the present disclosure, an exposure head includes a substrate assembly including a first light emitting chip in which a plurality of light emitting elements are arranged in a main scanning direction, a second light emitting chip in which a plurality of light emitting elements are arranged in the main scanning direction, the second light emitting chip being arranged to partially overlap with the first light emitting chip such that an end portion thereof in the main scanning direction overlaps with an end portion of the first light emitting chip in the main scanning direction when viewed in a sub-scanning direction, and a substrate on which the first light emitting chip and the second light emitting chip are mounted, a lens array including a plurality of lenses configured to focus light emitted from the light emitting elements of the first light emitting chip and the second light emitting chip, a retaining member configured to retain the substrate assembly and the lens array such that the lens array faces the light emitting elements, and a first adhesion portion. In a state where an area on the substrate where the end portion of the second light emitting chip in the main scanning direction and the end portion of the first light emitting chip in the main scanning direction overlap when viewed in the sub-scanning direction is referred to as a first area, the first adhesion portion is configured to adhere both end portions of the substrate assembly in the sub-scanning direction to the retaining member in the first area.

Features of the present disclosure will become apparent from the following description of embodiments with reference to the attached drawings. The following description of embodiments are described by way of example.

DESCRIPTION OF THE EMBODIMENTS

A substrate is disposed at a position where a distance between the substrate and a lens array is adjusted with respect to a casing, so as to focus light emitted from LEDs through lenses to form an image on a photosensitive drum. However, the adhesive used to attach the substrate to the casing may be affected by heat generated by the emission of light of LEDs and may expand. Hitherto, in such a case, a relative position of the substrate with respect to the casing may partially be varied from the original position, and especially among LED chips arranged in a staggered fashion on a substrate, amounts of light irradiated on the photosensitive drum may be varied, such that an optical performance of the exposure head with respect to the photosensitive drum may be deteriorated.

The present embodiment provides an exposure head in which a deterioration of optical performance of the exposure head caused by an adhesive adhering a substrate on which a plurality of light emitting elements are mounted to a casing is suppressed.

Image Forming Apparatus

Figure 1:
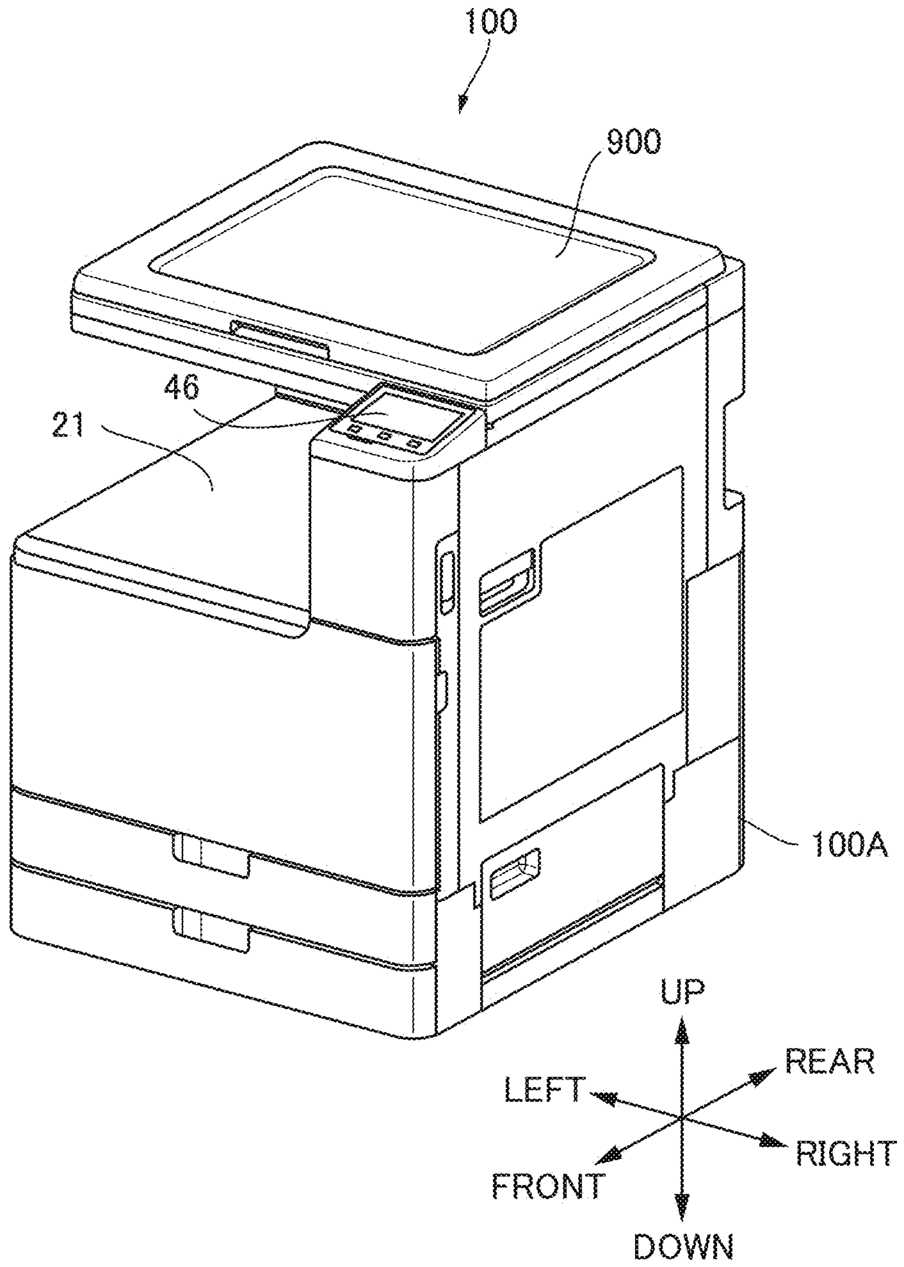
FIG. 1 is an exterior perspective view of an image forming apparatus that adopts an exposure head of the present embodiment.
Figure 2:
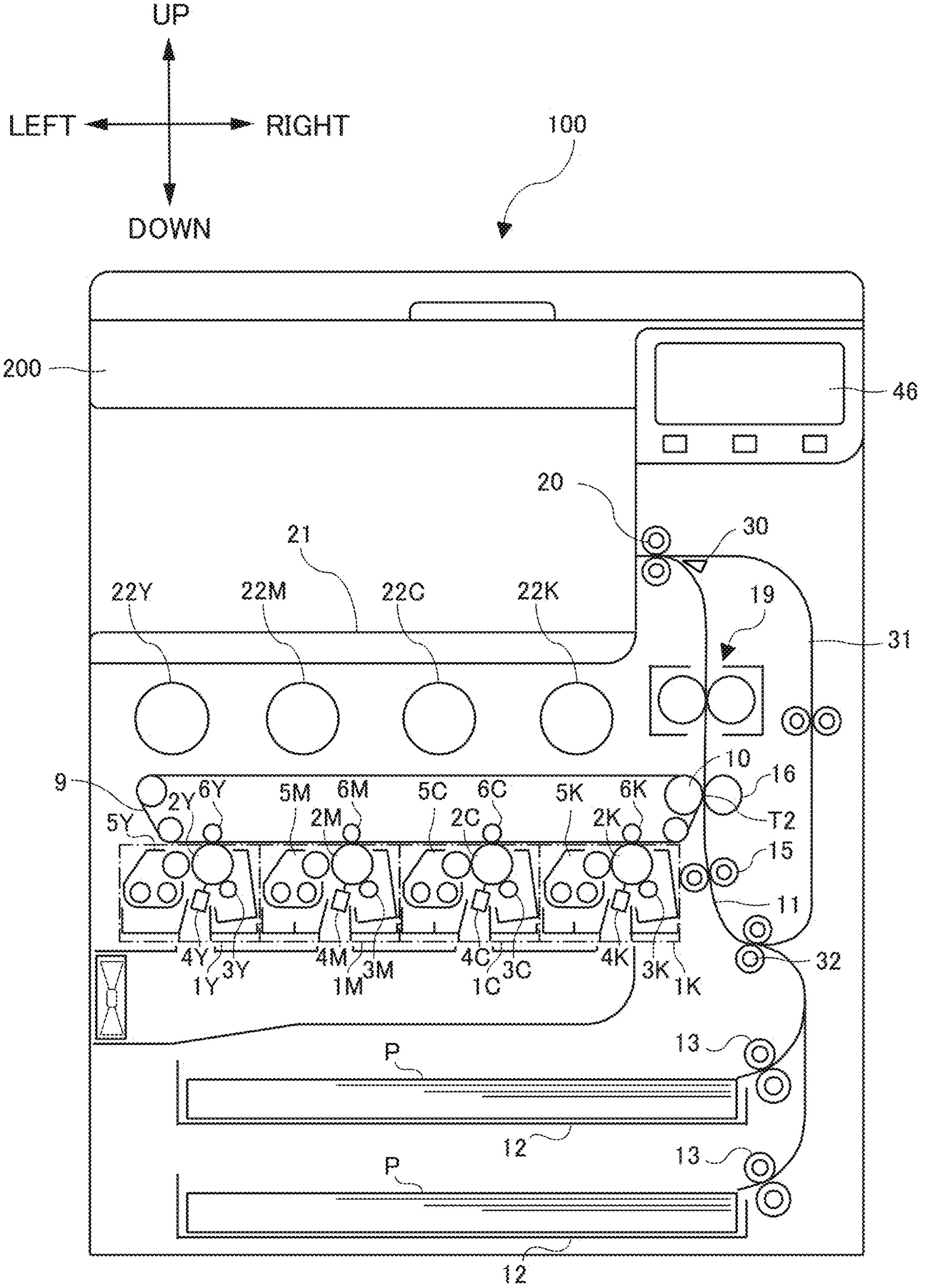
FIG. 2 is a schematic view illustrating a configuration of the image forming apparatus.

A present embodiment will be described below. First, an image forming apparatus suitable for adopting an exposure head of the present embodiment will be described with reference to FIGS. 1 and 2. FIGS. 1 and 2 illustrate, as an example, an image forming apparatus 100 of an in-body sheet discharge type. The image forming apparatus 100 illustrated in FIG. 1 includes an apparatus body 100A, and a document reading apparatus 900 for reading an image information of a document, wherein a sheet discharge tray 21 for supporting recording materials P discharged from the apparatus body 100A is formed between the apparatus body 100A and the document reading apparatus 900. The image forming apparatus 100 forms a toner image corresponding to an image signal sent from the document reading apparatus 900 or an external apparatus such as a personal computer not shown on a recording material.

An operation portion 46 including a display portion for displaying various information or keys through which various information may be entered by an operation by a user is disposed on a front side of the apparatus body 100A. In the present specification, a side on which the user stands to operate the operation portion 46 to operate the image forming apparatus 100 is referred to as "front", and an opposite side thereof is referred to as "rear". Further, a left side when the image forming apparatus 100 is viewed from the front side is referred to as "left", and a right side when the image forming apparatus 100 is viewed from the front side is referred to as "right".

A conveyance process of a recording material of the image forming apparatus 100 will be described. As illustrated in FIG. 2, the recording material P is accommodated in a manner supported within a cassette 12, and the recording material P is supplied to a conveyance path 11 one by one at a corresponding timing with an image forming timing by a feeding roller 13. Further, the recording material P supported on a manual feed tray not shown may supplied one by one to the conveyance path 11. In a state where the recording material P is conveyed to a registration roller 15 arranged in midway of the conveyance path 11, skew correction and timing correction of the recording material P are performed by the registration roller 15, before the recording material P is sent to a secondary transfer portion T2. The secondary transfer portion T2 is a transfer nip portion formed of a secondary transfer inner roller 10 and a secondary transfer outer roller 16 that face each other. By having a secondary transfer voltage applied to the secondary transfer inner roller 10 at the secondary transfer portion T2, the toner image is secondarily transferred from an intermediate transfer belt 6 to the recording material P.

A forming process of image that has been sent to the secondary transfer portion T2 at a similar timing as a conveyance process of the recording material P to the secondary transfer portion T2 described above will be described. At first, image forming units 1Y, 1M, 1C, and 1K will be described. However, the image forming units 1Y to 1K have approximately the same configuration, except for the difference in the colors of toner used in developing units 5Y, 5M, 5C, and 5K, which are yellow, magenta, cyan, and black. The image forming unit 1Y of yellow is described as an example in the following description, and the descriptions of other image forming units 1M, 1C, and 1K are omitted.

The image forming unit 1Y includes a photosensitive drum 2Y, a charging unit 3Y, an exposure head 4Y, and a developing unit 5Y The photosensitive drum 2Y serving as a photosensitive member has its surface uniformly charged in advance by the charging unit 3Y, and thereafter, an electrostatic latent image is formed by the exposure head 4Y being driven based on a signal of image information. The exposure head 4Y is formed in a long shape that extends in a rotational axis direction, i.e., main scanning direction, of the photosensitive drum 2Y, and exposes the photosensitive drum 2Y using a plurality of light emitting elements arranged along the main scanning direction. The light emitting element may be, for example, a light emitting diode (LED) or an organic electro-luminescence (organic EL). The details of the exposure head 4Y will be described below.

The electrostatic latent image formed on the photosensitive drum 2Y is visualized through a toner image developed by the developing unit 5Y Thereafter, a predetermined pressing force and primary transfer voltage are applied by a primary transfer roller 6Y that is arranged to face the image forming unit 1Y with an intermediate transfer belt 9 interposed therebetween, and the toner image formed on the photosensitive drum 2Y is primarily transferred onto the intermediate transfer belt 9. That is, a primary transfer portion for primarily transferring the toner image formed on the photosensitive drum 2Y by the intermediate transfer belt 9 and the primary transfer roller 6Y to the intermediate transfer belt 9 is formed. A transfer residual toner that slightly remains on the photosensitive drum 2Y after primary transfer is removed by a photosensitive drum cleaner not shown, and the apparatus prepares for a subsequent image creating process.

The intermediate transfer belt 9 is stretched by the secondary transfer inner roller 10 and a plurality of stretch rollers, and driven to move in a counterclockwise direction. The image creating processes of respective colors processed by the image forming units 1Y to 1K are performed at a corresponding timing at which the toner image is sequentially superposed on the toner image of a color formed upstream in a movement direction primarily transferred to the intermediate transfer belt 9. As a result, a full-color toner image is finally formed on the intermediate transfer belt 9 and conveyed to the secondary transfer portion T2. The secondary transfer portion T2 is composed by having the secondary transfer inner roller 10 and the secondary transfer outer roller 16 nip the intermediate transfer belt 9, and by having a transfer bias applied thereto, the full-color toner image on the intermediate transfer belt 9 is transferred onto the sheet. A transfer portion for transferring the toner image formed on photosensitive drum to the recording material is formed by the primary transfer portion and the secondary transfer portion T2. The transfer residual toner having passed through the secondary transfer portion T2 is removed from the intermediate transfer belt 9 by a secondary transfer cleaner not shown.

By the conveyance process and the image creating process described above, the timings of the recording material P and the full-color toner image correspond at the secondary transfer portion T2, and a toner image is secondarily transferred from the intermediate transfer belt 9 to the recording material P. Thereafter, the recording material P is conveyed to a fixing unit 19 where pressure and heat is applied by the fixing unit 19, and the toner image is fixed to the recording material P. In the case of simplex printing, the recording material P to which the toner image has been fixed as described above is discharged by a sheet discharge roller 20 that rotates in a normal direction onto the sheet discharge tray 21. Meanwhile, in the case of duplex printing, after the recording material P is conveyed by the sheet discharge roller 20 that rotates in a normal direction until a trailing edge of the recording material P has passed through a switching member 30, the recording material P has its leading and trailing edges switched by the sheet discharge roller 20 that has been switched to rotate in a reverse direction, and conveyed to a duplex conveyance path 31. Thereafter, the recording material P is sent again to the conveyance path 11 by a refeeding roller 32. The conveyance process and the image creating process on a second surface are the same as the above-mentioned processes, such that descriptions thereof are omitted.

Toner bottles 22Y to 22K accommodating toner for replenishment to be replenished to the developing units 5Y to 5K are disposed above the intermediate transfer belt 9 in an attachable and detachable manner to a toner replenishing mechanism not shown. Appropriate amount of toner is replenished at an appropriate timing by the toner replenishing mechanism from the toner bottles 22Y to 22K to the corresponding developing units 5Y to 5K.

Exposure Head

Figure 3:
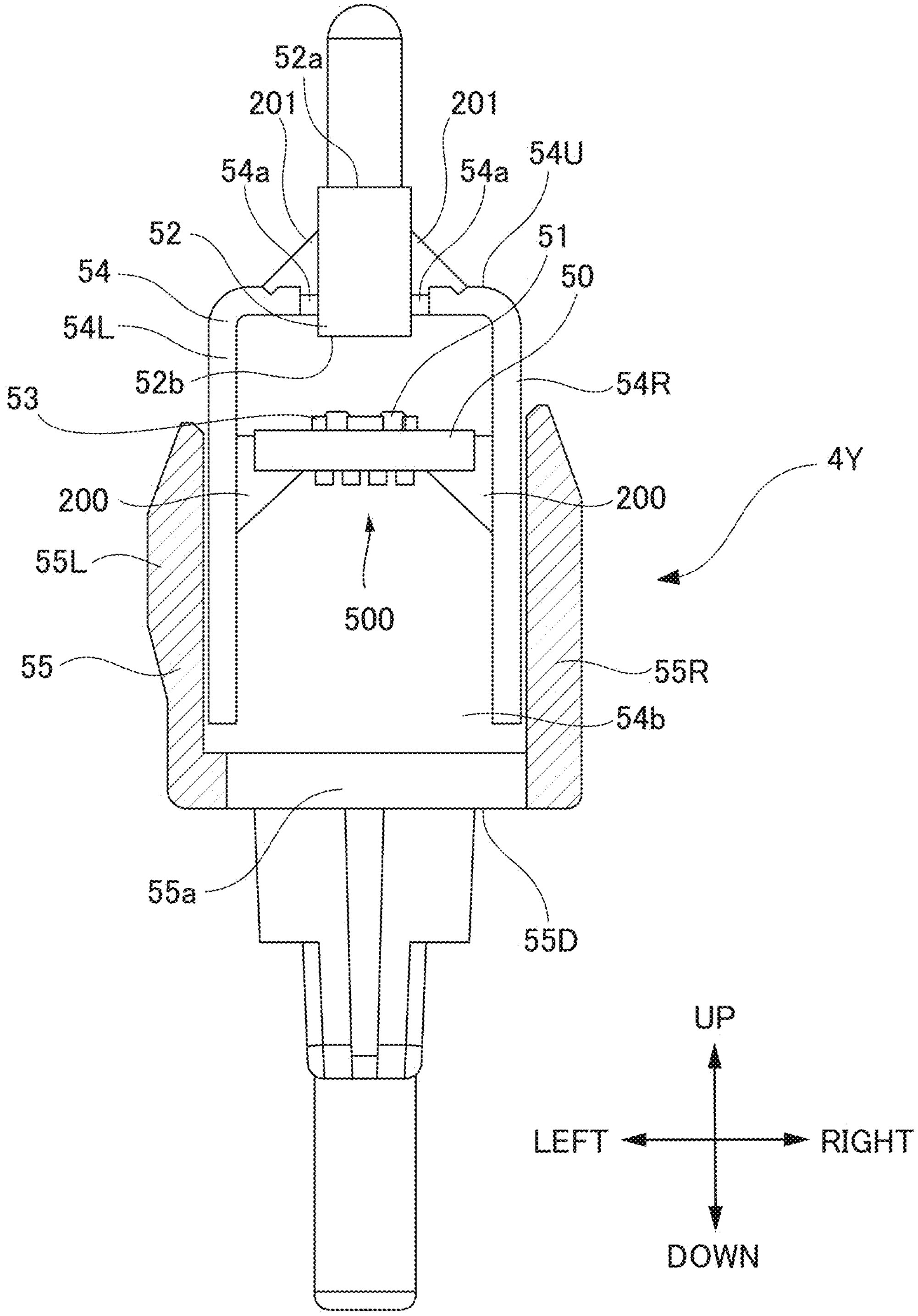
FIG. 3 is a cross-sectional view of an exposure head.

Next, the exposure head 4Y will be described based on FIGS. 3 to 4E with reference to FIG. 2. As illustrated in FIG. 3, the exposure head 4Y includes a substrate assembly 500, a lens array 52, an exposure casing 54 serving as a retaining member for retaining the substrate assembly 500 and the lens array 52, and a casing support member 55 for supporting the exposure casing 54. The substrate assembly 500 includes an LED chip 53 on which a plurality of LEDs 51 are arranged, and an exposure substrate 50 on which the plurality of LED chips 53 are mounted. The exposure substrate 50 is a substrate formed of resin serving as insulating material, and on one surface thereof are mounted the LED chips 53. Further, a circuit for controlling the light emission of the LED chips 53 is formed on the exposure substrate 50 by a printed wiring pattern formed on the substrate surface, and a large number of circuit elements including electronic components and electric components, such as driver ICs, resistors, and capacitors, which are mounted on the substrate surface.

Figure 4A:
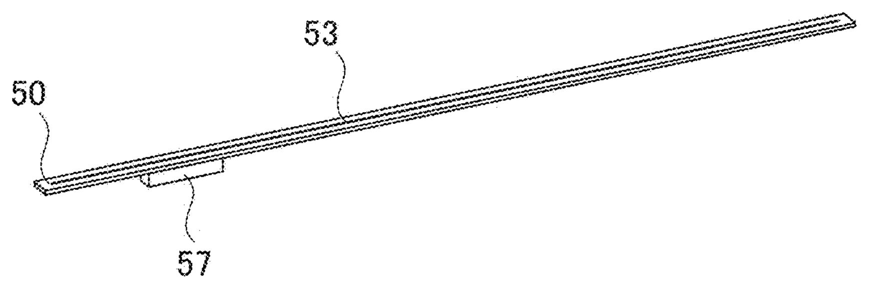
FIG. 4A is a perspective view of an exposure substrate.

As illustrated in FIG. 4A, the LED chips 53 serving as light emitting chips are mounted on one surface side of the exposure substrate 50, and an FFC connector 57 is mounted to a second surface side that is opposite to the first surface of the exposure substrate 50. A first end of a flexible flat cable (hereinafter referred to as FFC) no shown is connected to the FFC connector 57. The other end of the FFC is connected to a control portion not shown disposed on the apparatus body 100A of the image forming apparatus 100 via a body-side connector. A printed wiring pattern for supplying control signals to the respective LED chips 53 is provided on the surface of the exposure substrate 50, by which the FFC connector 57 is electrically connected to the printed wiring pattern. Therefore, when a control signal from the control portion of the image forming apparatus 100 is entered via the FFC and the FFC connector 57 to the exposure substrate 50, the LED chip 53 is driven, i.e., to emit light or to turn off, based on the entered control signal.

LED Chip

Figure 4B:
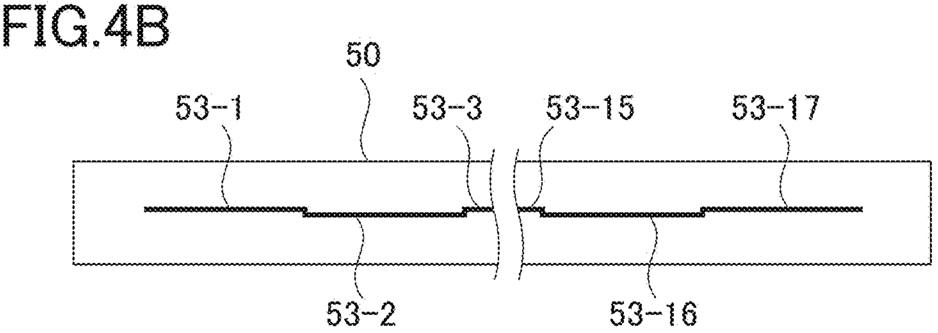
FIG. 4B is a view illustrating the exposure substrate from a photosensitive drum side.
Figure 4C:
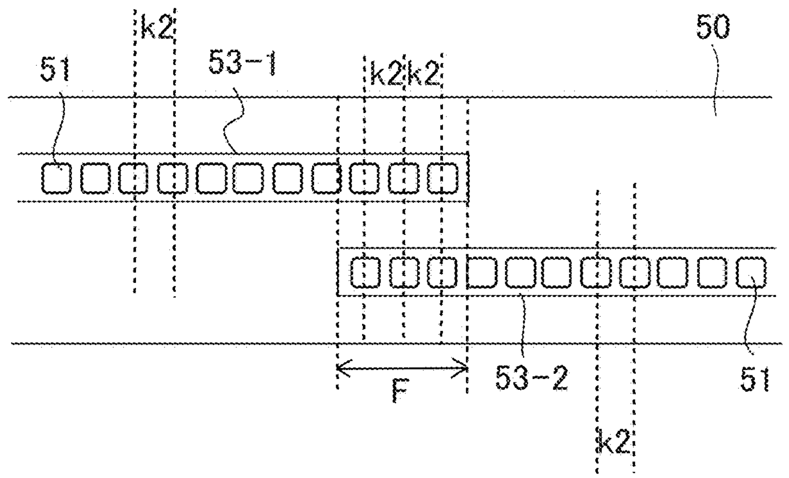
FIG. 4C is a view illustrating LEDs on the exposure substrate.

As illustrated in FIG. 4B, a plurality of, the number of which is 17 according to the present example, LED chips 53-1 to 53-17 are arranged on one surface side of the exposure substrate 50. A plurality of LEDs 51 are aligned along a longitudinal direction, i.e., main scanning directions, of each of the respective LED chips 53-1 to 53-17. As illustrated in FIG. 4C, a center-to-center distance "k2" of adjacent LEDs 51 on the LED chip 53 corresponds to a recording resolution of the image forming apparatus 100. For example, in a case where the recording resolution of the image forming apparatus 100 is "1200 dpi", the LEDs 51 are arranged such that the center-to-center distance "k2" of adjacent LEDs 51 is set to "21.16 μm". According to the present embodiment, an exposure range of the exposure head 4Y is "approximately 314 mm". The photosensitive drum 2 is formed such that a length of a photosensitive layer in a rotational axis direction is "314 mm" or longer. A length of a long side of the recording material P having an A4 size and a length of a short side of the recording material P having an A3 size are each "297 mm", such that the exposure head 4Y of the present embodiment has an exposure range allowing the image to be formed on the recording material P having the A4 size and the recording material P having the A3 size.

The LED chips 53-1 to 53-17 described above are arranged alternately in a staggered fashion along the main scanning direction, i.e., longitudinal direction, at different positions in a sub-scanning direction, i.e., short direction. As illustrated in FIG. 4B, the odd-numbered LED chips 53-1, 53-3, . . . 53-17 counting from the left side are a plurality of first light emitting chips forming a first chip group that are aligned in one line with an interval therebetween along a longitudinal direction of the exposure substrate 50. Further, the even-numbered LED chips 53-2, 53-4, . . . 53-16 counting from the left side are a plurality of second light emitting chips forming a second chip group that are aligned in one line with an interval therebetween along a longitudinal direction of the exposure substrate 50 at a different position in the sub-scanning direction as the first light emitting chips 53-1, 53-3, . . . 53-17.

In the present embodiment, the LED chips 53-1 to 53-17 are arranged in a staggered fashion such that a right end portion of the first LED chip 53-1 and a left end portion of the second LED chip 53-2 regarding the longitudinal direction are overlapped in the main scanning direction when viewed from the sub-scanning direction, as illustrated in FIG. 4C. Further, although not shown, a right end portion of the second LED chip 53-2 and a left end portion of the third LED chip 53-3 are overlapped, and a right end portion of the third LED chip 53-3 and a left end portion of the fourth LED chip 53-4 are overlapped. The subsequent LED chips are similarly overlapped in the main scanning direction. As described, the first light emitting chips 53-1, 53-3, . . . 53-17 and the second light emitting chips 53-2, 53-4, . . . 53-16 are arranged such that end portions on opposite sides in the main scanning direction when viewed from the sub-scanning direction are overlapped. That is, in the overlapped portion of the first light emitting chip and the second light emitting chip, in a state where an end portion of the first light emitting chip is referred to as one end portion, i.e., second end portion, in the main scanning direction, the one end portion of the first light emitting chip overlaps with the other end portion, i.e., first end portion, in the main scanning direction of the second light emitting chip. An area on the exposure substrate 50 where the end portion of the first light emitting chip and the end portion of the second light emitting chip overlap when viewed in the sub-scanning direction is hereinafter referred to as an overlap area F or first area. A plurality of such first areas F exist on the exposure substrate 50 as described above.

Further, in the example illustrated in FIG. 4C, in the overlap area F where the LED chip 53-1 and the LED chip 53-2 overlap, three LEDs 51 are positioned on each of the end portions of the LED chip 53-1 and the LED chip 53-2 in a superposed manner when viewed in the sub-scanning direction. In the overlap area F serving as the first area, the three LEDs 51 of the LED chip 53-1 and the three LEDs 51 of the LED chip 53-2 approximately correspond at the center-to-center distance "k2". Thereby, switching of the LEDs 51 used for exposure may be performed without any light amount difference between the LED chip 53-1 and the LED chip 53-2. Further, even if there are tolerances in the positions of the LEDs 51 arranged at the lengths or endmost portions in the longitudinal directions of each of the LED chips 53-1 and 53-2, the LED chip 53-1 and the LED chip 53-2 are arranged on the exposure substrate 50 such that the plurality of LEDs 51 respectively included therein are not relatively misregistered in the longitudinal direction. The same applies for the other LED chips. Thereby, light amount unevenness in the longitudinal direction when exposing the photosensitive drum 2Y does not easily occur. The number of LEDs 51 superposed in the overlap area F when viewed in the sub-scanning direction may be one or more.

Lens Array

Figure 4D:
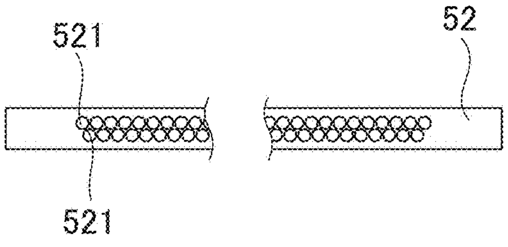
FIG. 4D is a view illustrating a lens array from the photosensitive drum side.

The lens array 52 is disposed at a distance from the exposure substrate 50 on one surface side of the exposure substrate 50 on which a plurality of LED chips 53 are mounted (refer to FIG. 3). As illustrated in FIG. 4D, the lens array 52 is a lens assembly including a plurality of lenses 521 that are aligned in two rows along the longitudinal direction, wherein the light emitted from the LEDs 51 is focused on the surface of the photosensitive drum 2Y As shown in FIG. 4E, regarding the respective lenses 521 of the lens array 52, the lenses are arranged alternately such that one of the lenses 521 on one row is arranged to be in contact with both the lenses 521 arranged adjacently in the direction of alignment of the other row of lenses 521. Each of the lenses 521 are a rod lens made of glass formed in a column shape, for example, and includes a light incident surface 52*b* into which the light emitted from the LED 51 enters and a light emission surface 52*a* through which the light entering from the light incident surface 52*b* is emitted (refer to FIG. 3). The material of the lenses 521 is not limited to glass, and it may be made of plastic. The shape of the lenses 521 is not limited to a column shape, and it may be a polygonal column, such as a hexagonal prism.

Figure 4E:
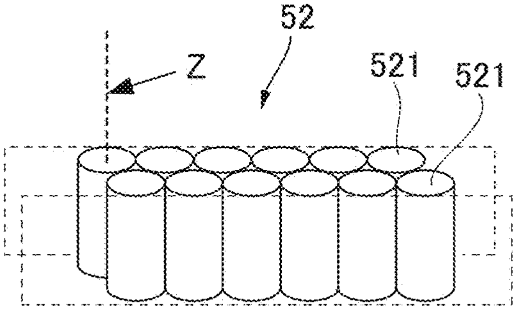
FIG. 4E is a perspective view of the lens array.

A dotted line Z illustrated in FIG. 4E shows an optical axis of the lens 521. The exposure head 4Y is disposed on the apparatus body 100A movably in a direction approximately corresponding to the optical axis of the lens 521 shown by the dotted line Z, hereinafter referred to as an optical axis direction, via a retreating mechanism not shown. The optical axis of the lens 521 refers to a line that connects a center of the light emission surface 52*a* of the lens 521 and a focal point of the relevant lens 521. As described above, since the lens array 52 is a lens assembly including a plurality of lenses 521, strictly speaking, the "optical axis" mentioned above refers to an optical axis of an arbitrary lens 521 among the plurality of lenses 521. Depending on the tolerance related to the assembly of the exposure head 4Y, the plurality of lenses 521 included in the lens array 52 may be somewhat tilted with respect to each other. Even in that case, however, the optical axes of the plurality of lenses 521 may be assumed to be misregistered in the same direction, without taking into account the tolerance-level misregistration.

Exposure Casing

Returning to FIG. 3, the exposure casing 54 retains the lens array 52 and the exposure substrate 50 at the upper and lower installation positions with a distance therebetween in the vertical direction. The exposure casing 54 is a member made of metal formed by bending a plate material, such as a galvanized sheet iron or a cold rolled steel sheet subjected to plating. As an example, the exposure casing 54 is formed by pressing a sheet metal such as a steel sheet to have an approximately U-shaped cross-section.

As illustrated in FIG. 3, the exposure casing 54 includes a planar portion 54U having formed thereon a first opening 54*a* into which the lens array 52 is inserted. The planar portion 54U is a portion that faces the photosensitive drum 2Y in the optical axis direction of the lens of the lens array 52 in the exposure casing 54, and retains the lens array 52. The planar portion 54U is not limited to a flat surface, and it may be a curved surface that is somewhat curved. Further, the exposure casing 54 includes an extended portion 54R on one side in a short direction, i.e., sub-scanning direction, of the planar portion 54U in a direction separating from the photosensitive drum 2Y Further, the exposure casing 54 includes an extended portion 54L on the other side in the short direction of the planar portion 54U in a direction separating from the photosensitive drum 2Y, disposed to oppose to the extended portion 54R.

The exposure casing 54 is formed such that the planar portion 54U serving as a first retaining portion and a pair of extended portions 54R and 54L serving as a second retaining portion integrally form an approximately U-shaped cross-section, so as to retain the lens array 52 and the substrate assembly 500 at the upper and lower installation positions with a distance therebetween in the vertical direction. Since the exposure casing 54 is formed to have an approximately U-shaped cross-section, and the extended portion 54R and the extended portion 54L form a pair, the substrate assembly 500 is inserted from a second opening 54*b* that is formed at a tip portion thereof. The substrate assembly 500 inserted from the second opening 54*b* is positioned by a jig not shown at an installation position where focus is set on the surface of the photosensitive drum 2Y, specifically, at an installation position where a distance between the exposure substrate 50, more specifically the LEDs 51, and the lens array 52, more specifically the light incident surface 52*b*, is set to a predetermined value. Then, the substrate assembly 500 inserted from the second opening 54*b* is adhered by an adhesion portion 200 to the extended portions 54L and 54R at both end portions of the exposure substrate 50 in the sub-scanning direction. As described later, an ultraviolet-curing, i.e., photosetting, adhesive, a sealant, or a thermosetting adhesive may be used for the adhesion portion 200.

Meanwhile, the lens array 52 is inserted to the first opening 54*a* of the planar portion 54U such that the light emission surface 52*a* of the lens is exposed to a side on which the photosensitive drum 2Y is arranged. The lens array 52 inserted to the first opening 54*a* is positioned at a position where a distance between the LED chip 53, more specifically the LEDs 51, mounted on the exposure substrate 50 and the lens array 52, more specifically the light incident surface 52*b*, is set to a predetermined value using a jig not shown, while adjusting an inclination thereof. The lens array 52 inserted to the first opening 54*a* is adhered by an adhesion portion 201 to the planar portion 54U at both end portions thereof in the sub-scanning direction. As described later, an ultraviolet-curing, adhesive, a sealant, or a thermosetting adhesive may be used for the adhesion portion 201.

Casing Support Member

Further, in the exposure head 4Y, the casing support member 55 having an approximately U-shaped cross-section is disposed on the second opening 54*b* side of the exposure casing 54. The casing support member 55 is a long-shaped member that extends in the main scanning direction, and it is disposed integrally with the exposure casing 54 such that the exposure casing 54 retaining the substrate assembly 500 and the lens array 52 is supported across the longitudinal direction.

Figure 5:
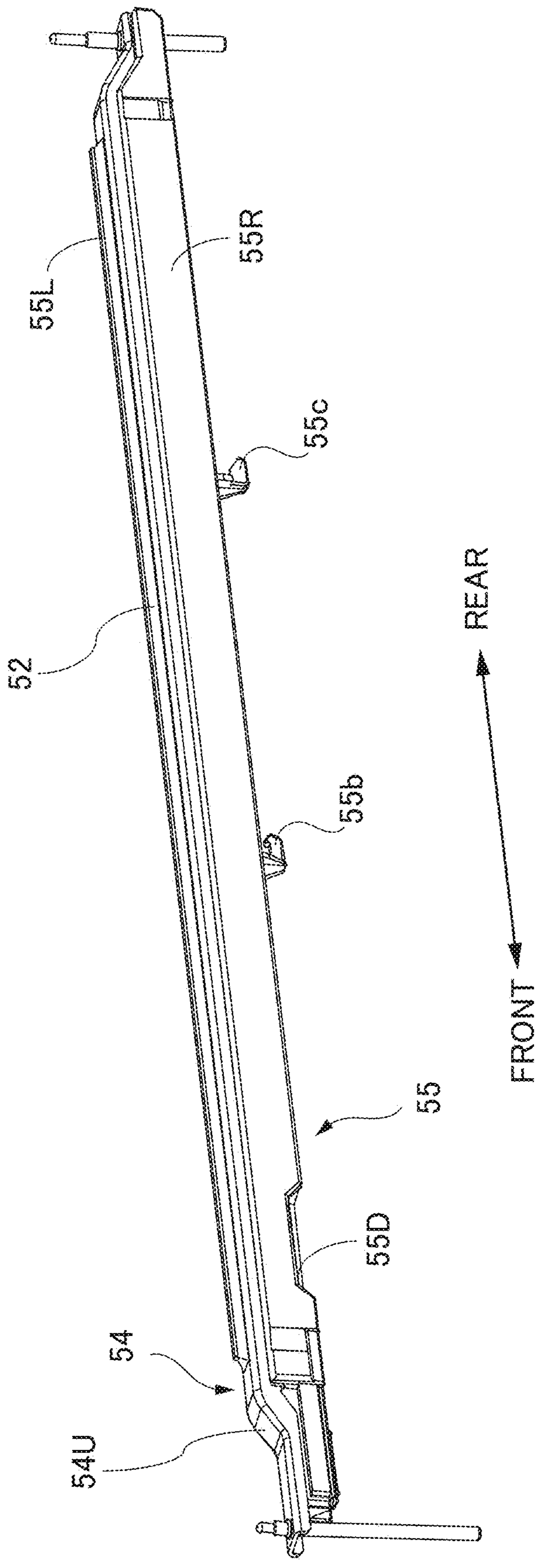
FIG. 5 is a perspective view of the exposure head.
Figure 6:
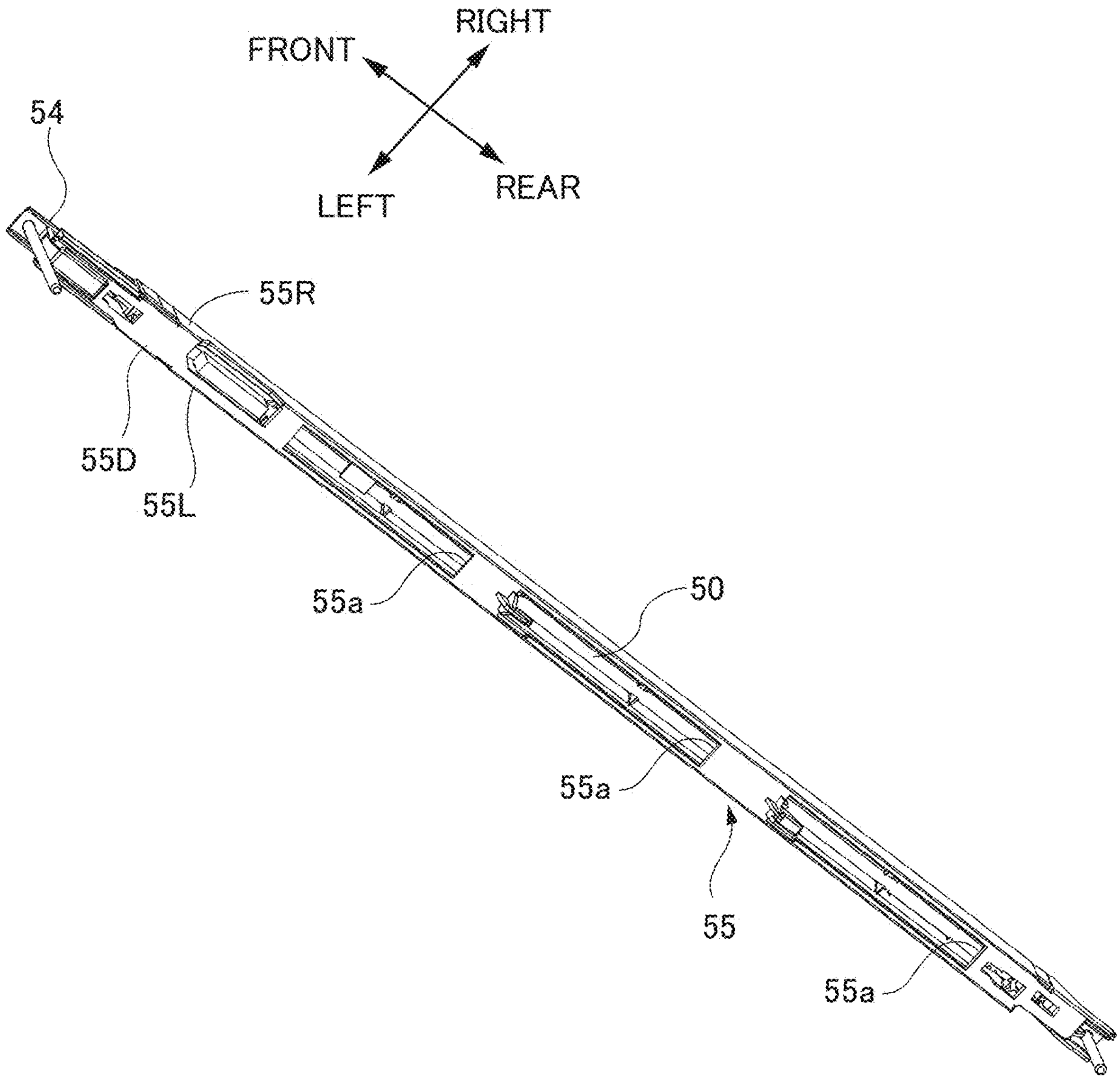
FIG. 6 is a perspective view of a rear surface of the exposure head.

As illustrated in FIGS. 5 and 6, the casing support member 55 is formed to have an approximately U-shaped cross-section (refer to FIG. 3), and includes a left side wall 55L, a right side wall 55R that faces the left side wall 55L in the sub-scanning direction, i.e., right-left direction, and a bottom surface portion 55D that faces the planar portion 54U of the exposure casing 54 between the left side wall 55L and the right side wall 55R. As illustrated in FIG. 6, a plurality of openings 55*a* are formed along the longitudinal direction on the bottom surface portion 55D of the casing support member 55. The openings 55*a* are formed at positions facing an opposite surface, i.e., rear surface of the exposure substrate 50, from a mounting surface, i.e., the front surface of the exposure substrate 50, on which the LEDs 51 of the exposure substrate 50 are mounted, between the left side wall 55L and the right side wall 55R in the sub-scanning direction.

Regarding Adhesion of Exposure Substrate

As described above, the exposure substrate 50 is adhered to the exposure casing 54 by the adhesion portion 200. When adhering the exposure substrate 50, it may be possible to use an adhesive formed of an ultraviolet-curing resin that is cured by ultraviolet, i.e., ultraviolet-curing adhesive, to adhere the exposure substrate 50 to the exposure casing 54 at multiple locations in the longitudinal direction of the exposure substrate 50. Further, in order to seal the gap between the exposure substrate 50 and the exposure casing 54, more specifically the extended portions 54L and 54R, that have been adhered using the ultraviolet-curing adhesive, hereinafter referred to as UV adhesive, the entire area in the longitudinal direction of the exposure substrate 50 may be adhered using a sealant having a lower viscosity than the UV adhesive. A thermal expansion coefficient of the cured UV adhesive is smaller than a thermal expansion coefficient of the cured sealant, i.e., a sealing member, and a Young's modulus of the cured UV adhesive is greater than a Young's modulus of the cured sealant.

Since circuit elements are mounted on the exposure substrate 50, the temperature of the exposure casing 54 rises by the heat generated from the circuit elements. When the exposure casing 54 rises in temperature, due to the difference between the thermal expansion coefficient of the UV adhesive used to adhere the exposure substrate 50 and the exposure casing 54 and the thermal expansion coefficient of the sealant, there occurs a dispersion in the volume change of the adhesives. Hitherto, although as little as in the order of a few to few tens of m, the exposure substrate 50 had moved horizontally in the sub-scanning direction, i.e., right-left direction, with respect to the exposure casing 54, or the exposure substrate 50 had been twisted in the up-down direction such that one end thereof in the sub-scanning direction is moved up or down with respect to the other end.

If the exposure substrate 50 moves in the sub-scanning direction or is twisted in the up-down direction, the distance from the LED chips 53 mounted on the exposure substrate 50 to the light incident surface 52*b* of the lens array 52 changes, and the light amount being incident on the lens array 52 changes. That is, the relative positional relationship between the LED chip 53 and the lens array 52 changes. In a case where the LED chips 53 are arranged on the exposure substrate 50, i.e., on the substrate, in a staggered fashion along the longitudinal direction, for example, the light amount is increased by the odd-numbered LED chips 53 approaching the lens array 52, and the light amount is reduced by the even-numbered LED chips 53 moving away from the lens array 52. Especially, in the overlap area F (refer to FIG. 4C) of the odd-numbered LED chips 53 and the even-numbered LED chips 53, the misregistration of each of the LEDs 51 disposed thereon in the sub-scanning direction becomes great. Then, the light amount being incident on the lens array 52 at the overlap area F changes steeply, which may lead to the occurrence of image defects such as unevenness of density in which the density of toner images formed on the recording material P becomes discontinuous. That is, the optical performance of the exposure head 4Y may be deteriorated due to the adhesive.

Figure 7:
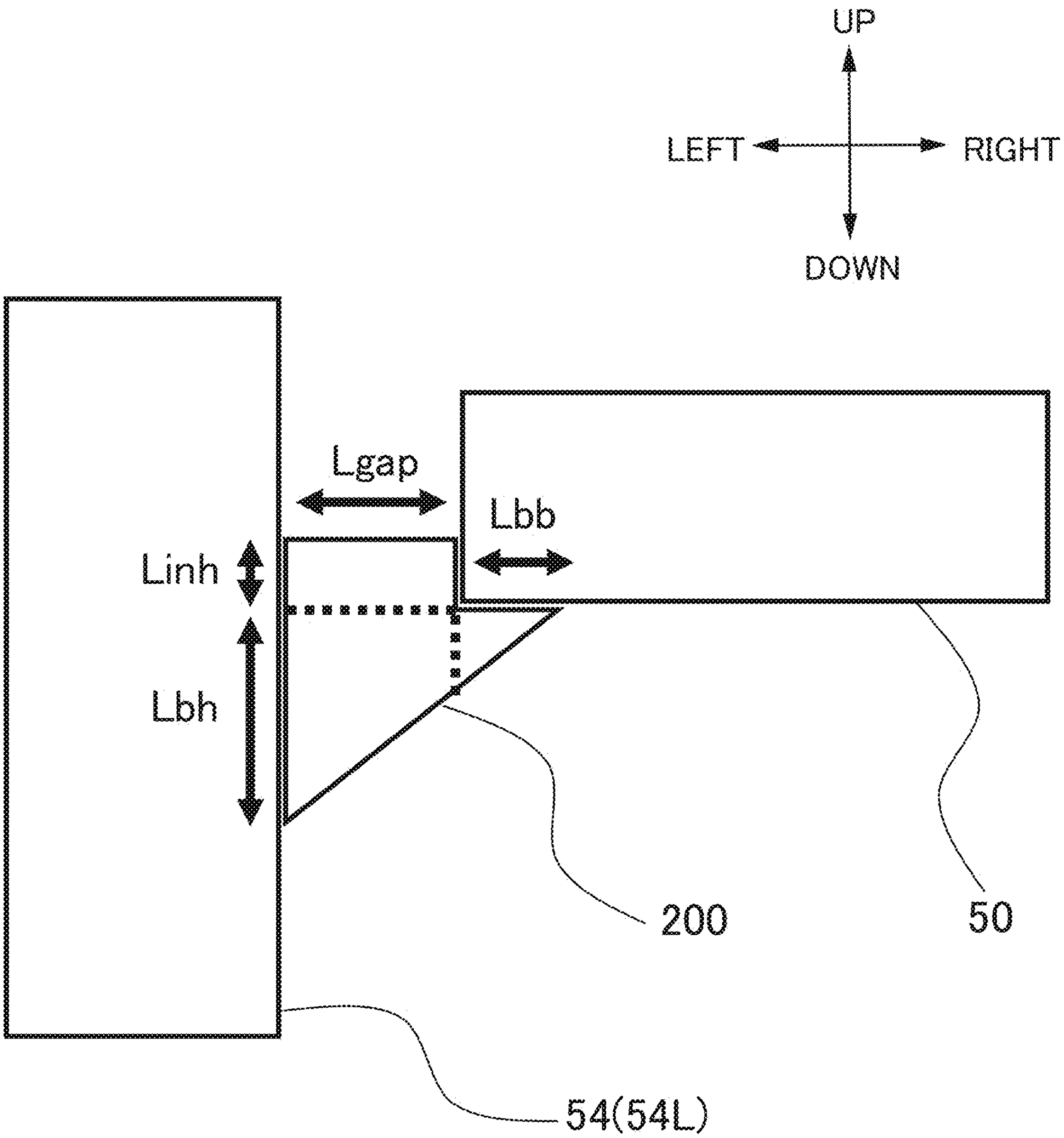
FIG. 7 is a view illustrating a physical model for simulating a contribution of movement and a contribution of twist with respect to an exposure casing of the exposure substrate by an adhesive.
Figure 8A:
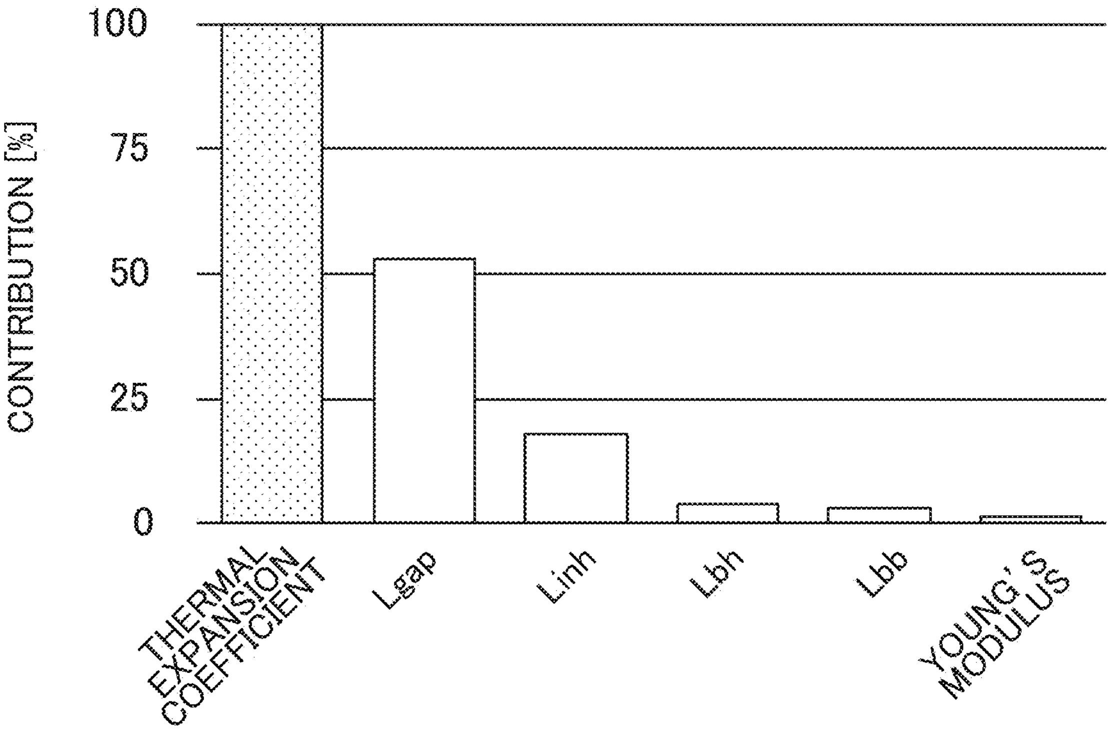
FIG. 8A is a graph showing the contribution of movement with respect to the exposure casing of the exposure substrate.
Figure 8B:
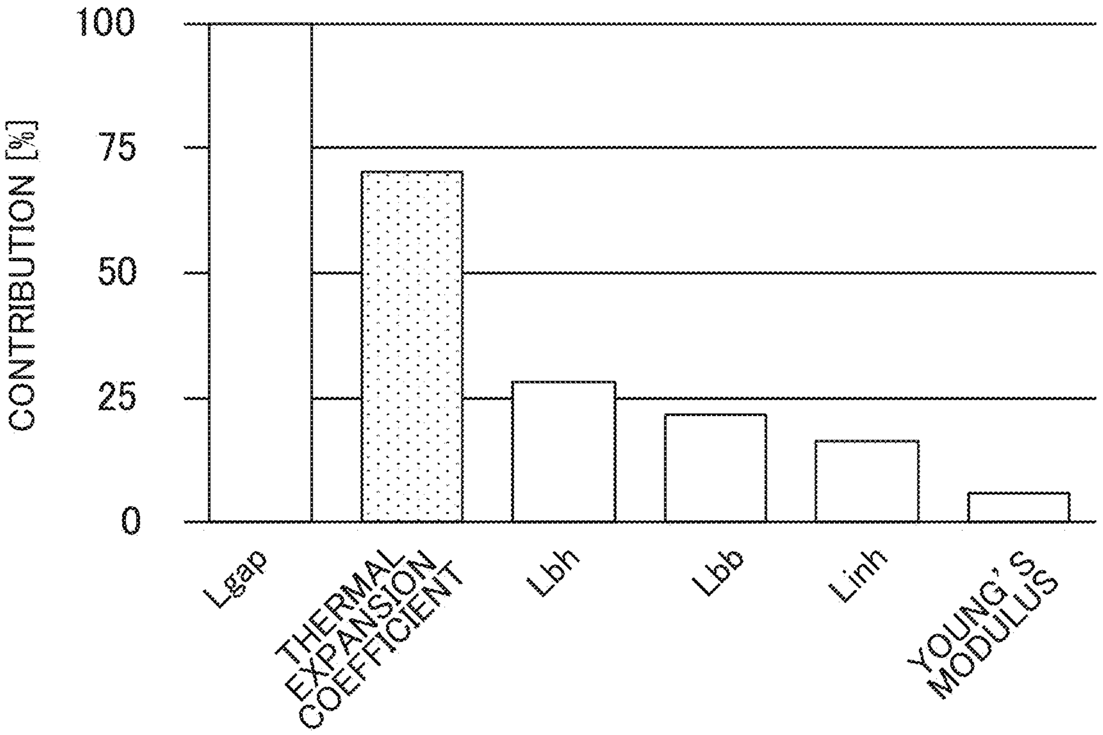
FIG. 8B is graph showing the contribution of twist with respect to the exposure casing of the exposure substrate.

In consideration of the above-mentioned issue, the present inventors have simulated a contribution of movement of the exposure substrate 50 and a contribution of twist of the exposure substrate 50 with respect to the exposure casing 54 by the adhesive according to a physical model. FIG. 7 illustrates a physical model for simulating the contribution of movement of the exposure substrate 50 and the contribution of twist of the exposure substrate 50 with respect to the exposure casing 54 by the adhesive. In FIG. 7, "Lgap" is an index indicating a contribution of the adhesion portion 200 in the gap between the exposure casing 54 and the exposure substrate 50 regarding the sub-scanning direction, and "Lbb" is an index indicating a contribution of the adhesion portion 200 in an adhesion area of the exposure substrate 50 regarding the sub-scanning direction. Further, "Linh" is an index indicating a contribution of the adhesion portion 200 at a portion where the exposure casing 54 and the exposure substrate 50 are superposed in the up-down direction, and "Lbh" is an index indicating a contribution of the adhesion portion 200 in an adhesion area of the exposure casing 54 excluding the "Linh" in the up-down direction. The "thermal expansion coefficient" and the "Young's modulus, i.e., vertical elasticity" in FIGS. 8A and 8B are indexes indicating the characteristics of the adhesion portion 200. The adhesion portion 200 described here is composed of cured adhesive, and the concept of the adhesive mentioned here includes the filler described above.

FIG. 8A is a graph showing the contribution of movement of the exposure substrate 50, and FIG. 8B is a graph showing the contribution of twist of the exposure substrate 50. As illustrated in FIGS. 8A and 8B, according to the simulation result, regarding the contribution of movement of the exposure substrate 50 and the contribution of twist of the exposure substrate 50, it can be recognized that the contribution of the "thermal expansion coefficient" of the adhesion portion 200 is greater than the other indexes. Therefore, by using an adhesive having a smaller thermal expansion coefficient than the sealant, the movement of the exposure substrate 50 and the twist of the exposure substrate 50 caused by the volume change of the adhesive in a state where the exposure casing 54 rises in temperature may be suppressed.

Therefore, according to the present embodiment, in order to adhere the exposure substrate 50, in addition to the UV adhesive and the sealant described above, a thermosetting adhesive that is cured by heat is used. In the present embodiment, a thermal expansion coefficient of the thermosetting adhesive used as a first adhesion portion is smaller than a thermal expansion coefficient of the sealant used as a second adhesion portion, and for example, it is "$3.0\times10^{-5}$/K" or more and "$6.0\times10^{-5}$/K" or less. In other words, the sealant has a greater thermal expansion coefficient than the thermosetting adhesive.

Figure 9:
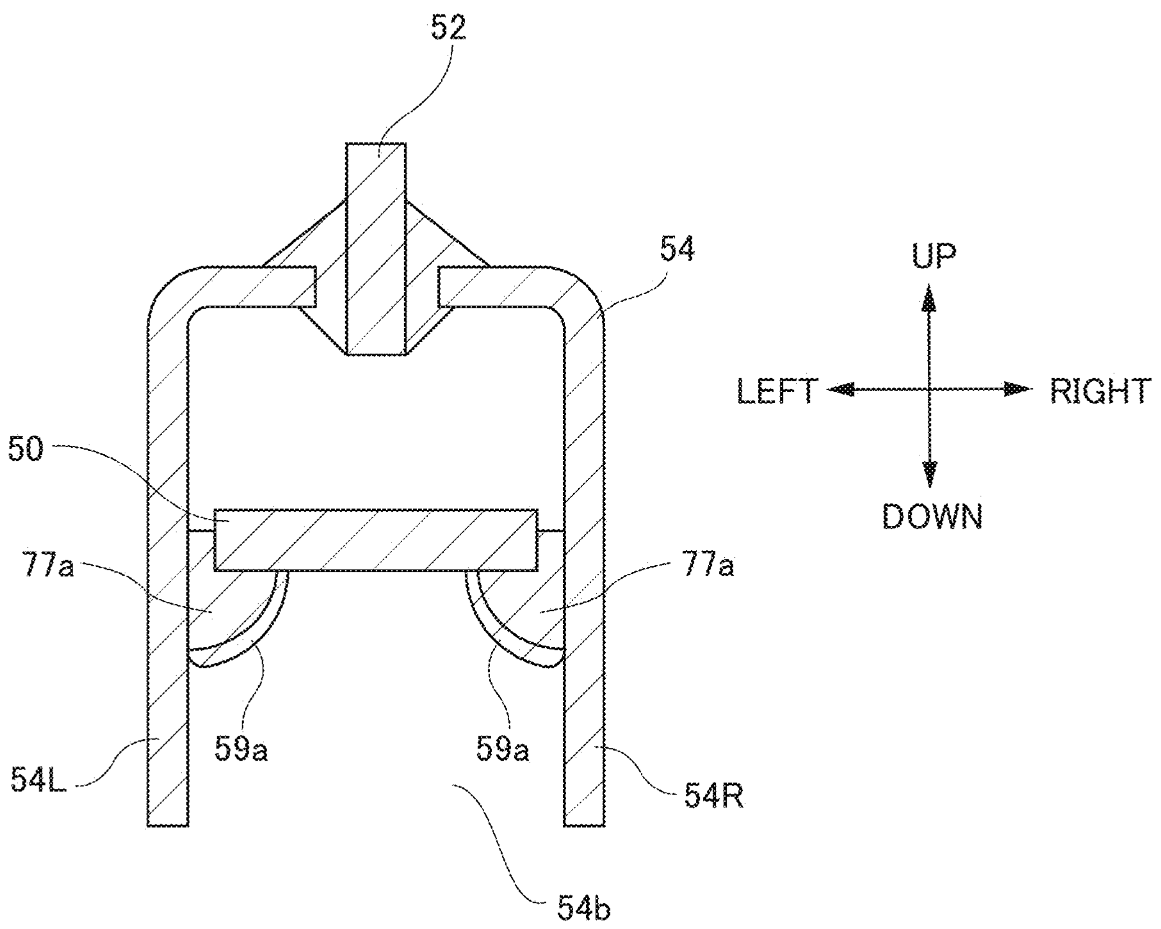
FIG. 9 is a schematic diagram illustrating an adhesion of the exposure substrate and the exposure casing.

The adhesion of the exposure casing 54 and the exposure substrate 50 according to the present embodiment will be described below with reference to FIGS. 9 to 13. In the present embodiment, as illustrated in FIG. 9, in order to adhere the exposure substrate 50 to the extended portions 54L and 54R of the exposure casing 54, a thermosetting adhesive 77*a* is used in the overlap area F (refer to FIG. 4C), as described in detail later.

Regarding Adhesion of Exposure Substrate by UV Adhesive

The exposure substrate 50 inserted through the second opening 54*b* to the exposure casing 54 is adhered by a UV adhesive to the extended portions 54L and 54R of the exposure casing 54 at both end portions in the sub-scanning direction, i.e., right-left direction, by which the exposure substrate 50 is pre-fixed to the exposure casing 54. In the present embodiment, an acrylic UV adhesive having a property to cure in a short time even under normal temperature by UV irradiation is used. By using the UV adhesive, the work time required to position the exposure substrate 50 at a desired installation position with respect to the exposure casing 54 using a tool or the like to realize pre-fixing may be cut down.

The exposure substrate 50 pre-fixed to the exposure casing 54 is adhered using the thermosetting adhesive 77*a* to the extended portions 54L and 54R of the exposure casing 54 at both end portions thereof in the sub-scanning direction, by which the exposure substrate 50 is permanently fixed to the exposure casing 54. According to the present embodiment, an epoxy-based thermosetting adhesive 77*a* is used. The thermosetting adhesive 77*a* is cured, for example, by heating for a few hours in an oven heated to 100° C.

Figure 10:
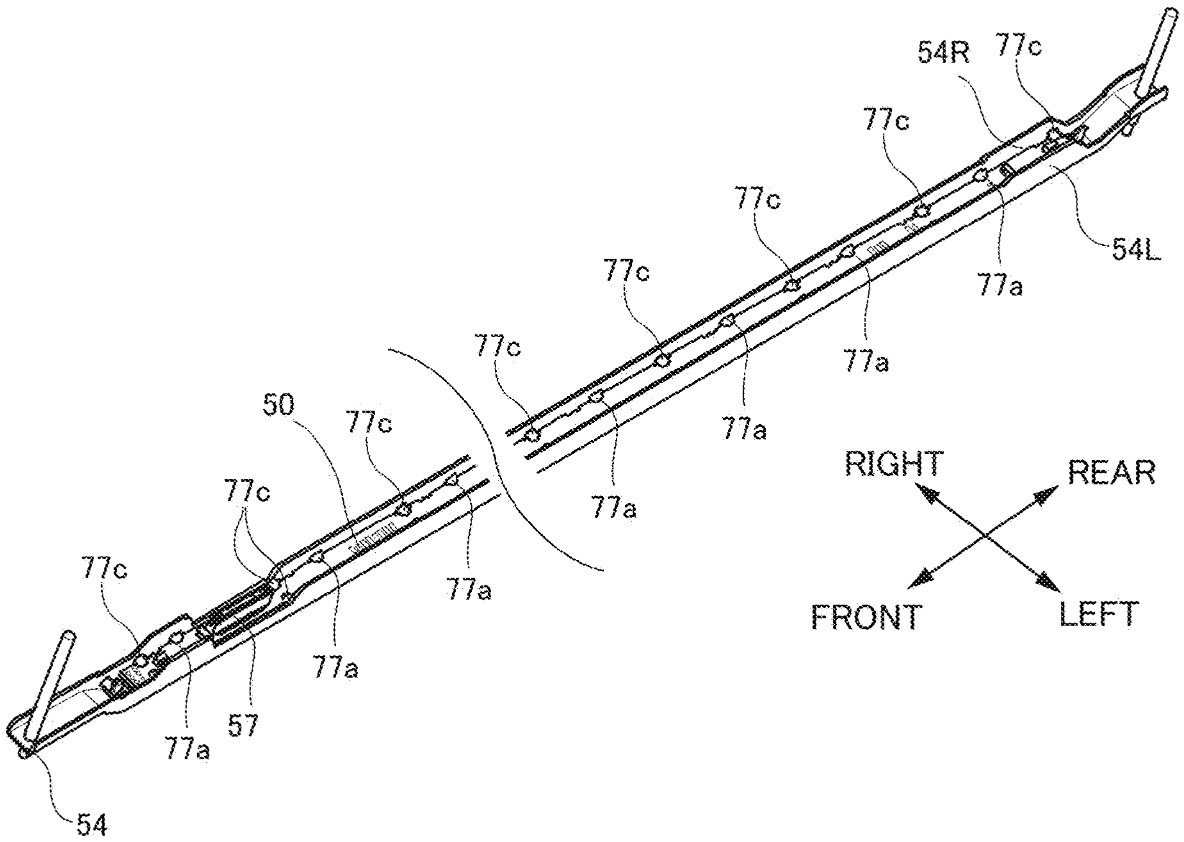
FIG. 10 is a perspective view illustrating the adhesion of the exposure substrate by a UV adhesive and a thermosetting adhesive.
Figure 11:
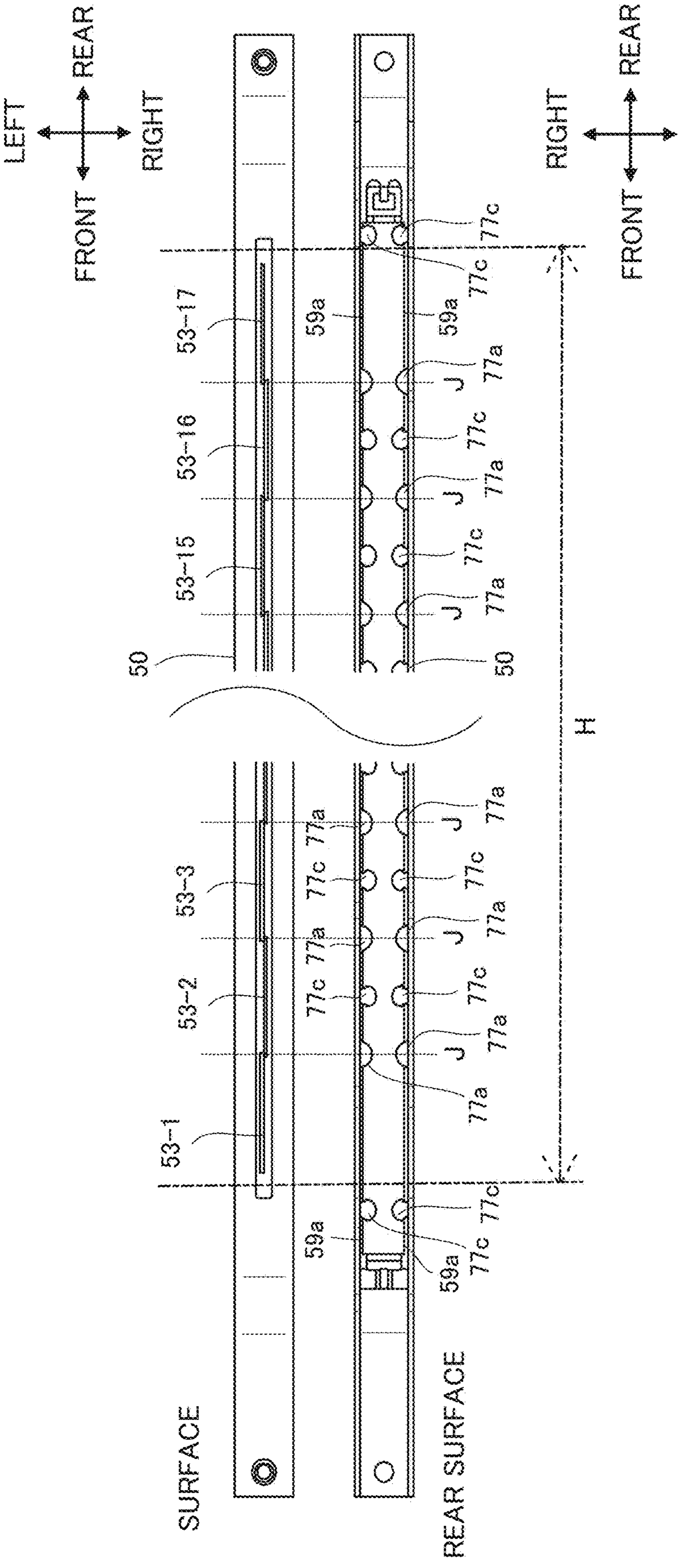
FIG. 11 is top view and a bottom view illustrating the adhesion of the exposure substrate by the UV adhesive and the thermosetting adhesive.

As illustrated in FIGS. 10 and 11, a UV adhesive 77*c* and the thermosetting adhesive 77*a* adhere the exposure substrate 50 at multiple locations with an interval therebetween in the main scanning direction, i.e., front-rear direction, at both end portions of the exposure substrate 50 in the sub-scanning direction, i.e., right-left direction. In FIG. 11, in order to facilitate understanding, the upper surface and the rear surface of the exposure substrate 50 are illustrated.

In the present embodiment, the UV adhesive 77*c* used as a third adhesive is disposed at a plurality of pre-fixing areas, i.e., second areas, other than the overlap area F, i.e., the first area, in the exposure substrate 50, constituting an third adhesion portion in which the exposure substrate 50 is adhered to the exposure casing 54. The UV adhesive 77*c* is preferably disposed at locations superposed when viewed in the sub-scanning direction and at a pitch of approximately regular intervals in the main scanning direction. In order to suppress warping of the exposure substrate 50, the UV adhesive 77*c* is preferably disposed at least at one location, preferably at three locations or more, among the plurality of pre-fixing areas of the exposure substrate 50 in the main scanning direction.

In the example illustrated in FIG. 11, at a first end of the exposure substrate 50 in the sub-scanning direction, in all the pre-fixing areas between the overlap area F and the overlap area F of the respective LED chips 53-1 to 53-17 with respect to the main scanning direction, in other words, in all the areas superposed with the respective LED chips 53-2 to 53-16 excluding the overlap areas F when viewed from the sub-scanning direction, i.e., at 15 locations, the UV adhesive 77*c* is disposed at a pitch of approximately regular intervals. It is preferable that the UV adhesive 77*c* is arranged such that a center of each pre-fixing area is set as reference in the main scanning direction. Further, in order to further suppress warping of the exposure substrate 50, the UV adhesive 77*c* may be disposed at areas outside an exposure range H on the photosensitive drum at both end portions in the main scanning direction of the exposure substrate 50.

In the present embodiment, the thermal expansion coefficient of the UV adhesive 77*c* is smaller than the thermal expansion coefficient of the thermosetting adhesive 77*a*, and for example, it is smaller than "$3.0\times10^{-5}$/K". This is because when the thermosetting adhesive 77*a* is heated and cured, the exposure substrate 50 pre-fixed using the UV adhesive 77*c* must be prevented from moving with respect to the exposure casing 54.

Regarding Adhesion of Exposure Substrate by Thermosetting Adhesive

Meanwhile, the thermosetting adhesive 77*a* is disposed at the plurality of the overlap areas F, i.e., the first area, on the exposure substrate 50, and constitutes an adhesion portion where the exposure substrate 50 is adhered to the exposure casing 54. The thermosetting adhesive 77*a* is preferably disposed at locations superposed when viewed in the sub-scanning direction and at a pitch of approximately regular intervals in the main scanning direction. In order to suppress movement and twist of the exposure substrate 50, the thermosetting adhesive 77*a* is preferably disposed at least at one location, preferably at three locations or more, among the plurality of the overlap areas F in the main scanning direction. Further, if the thermosetting adhesive 77*a* comes into contact with circuit elements mounted on the exposure substrate 50 within the overlap area F, the circuit elements may be damaged, such that the thermosetting adhesive 77*a* is positioned so as not to come into contact with the circuit elements. Furthermore, the thermosetting adhesive 77*a* is disposed so as to realize spot adhesion of the exposure substrate 50 to the exposure casing 54 within the overlap area F. This is because the thermosetting adhesive 77*a* aims at fixing the exposure substrate 50 and the exposure casing 54, and by spot adhesion, the exposure substrate 50 and the exposure casing 54 may be fixed with sufficient strength. Thus, by performing spot adhesion of the thermosetting adhesive 77*a*, it becomes possible to reduce the amount of use of the thermosetting adhesive 77*a* instead of disposing the thermosetting adhesive 77*a* uniformly in the overlap area F, such that costs may be cut down.

In the example illustrated in FIG. 11, the thermosetting adhesives 77*a* are disposed at a pitch of approximately regular intervals at 16 locations in all the overlap areas F of the LED chips 53-1 to 53-17 with respect to the main scanning direction of the exposure substrate 50 at one end in the sub-scanning direction. In the example, the thermosetting adhesive 77*a* is disposed between the UV adhesive 77*c* and the UV adhesive 77*c*. The Young's modulus of the thermosetting adhesive 77*a* is greater than the Young's modulus of the UV adhesive 77*c* and the Young's modulus of the sealant, and it is "10000 MPa" or greater, for example. That is, the stiffness after curing of the thermosetting adhesive 77*a* is higher than the stiffness after curing of the UV adhesive 77*c* and the stiffness of the sealant. As illustrated in FIG. 11, the thermosetting adhesive 77*a* is preferably disposed with a center of the overlap area F, illustrated by the dotted line J, in the main scanning direction set as reference.

Regarding Adhesion of Exposure Substrate by Sealant

Figure 12:
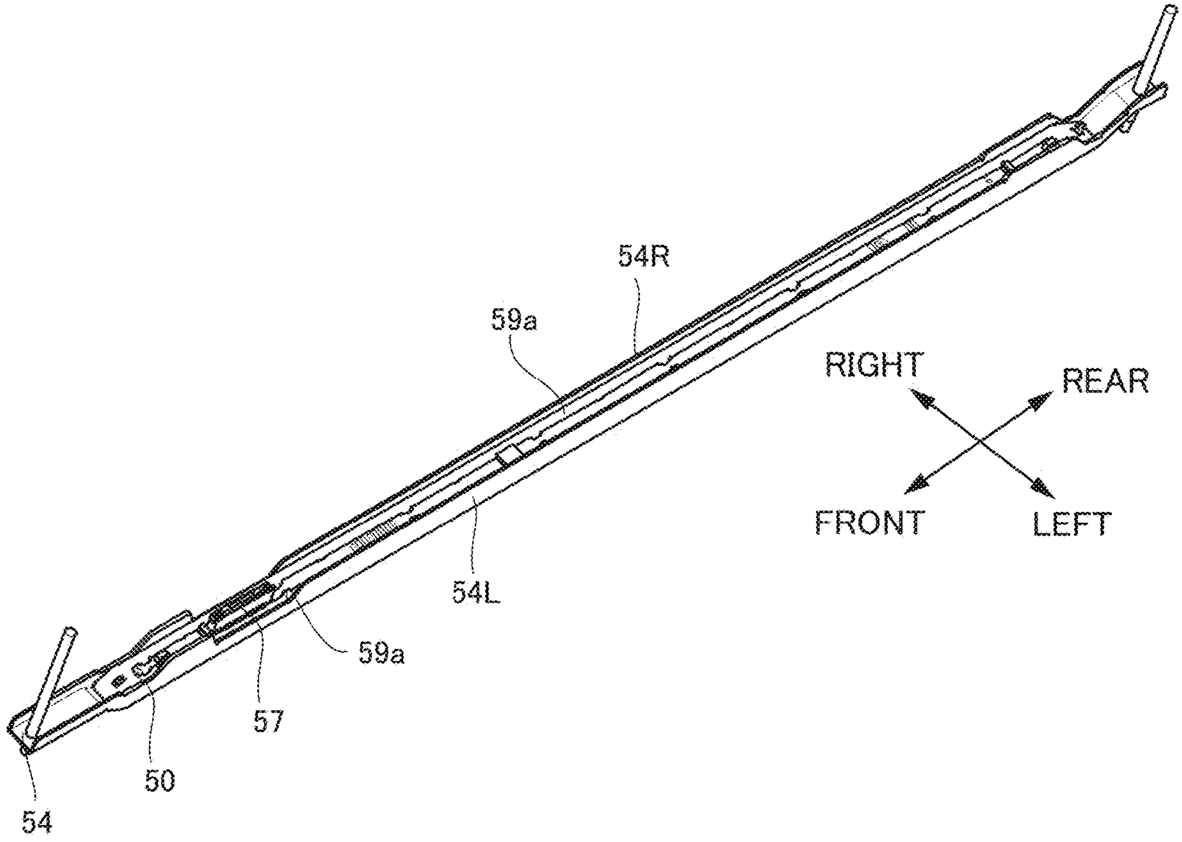
FIG. 12 is a perspective view illustrating the adhesion of the exposure substrate by a sealant.
Figure 13:
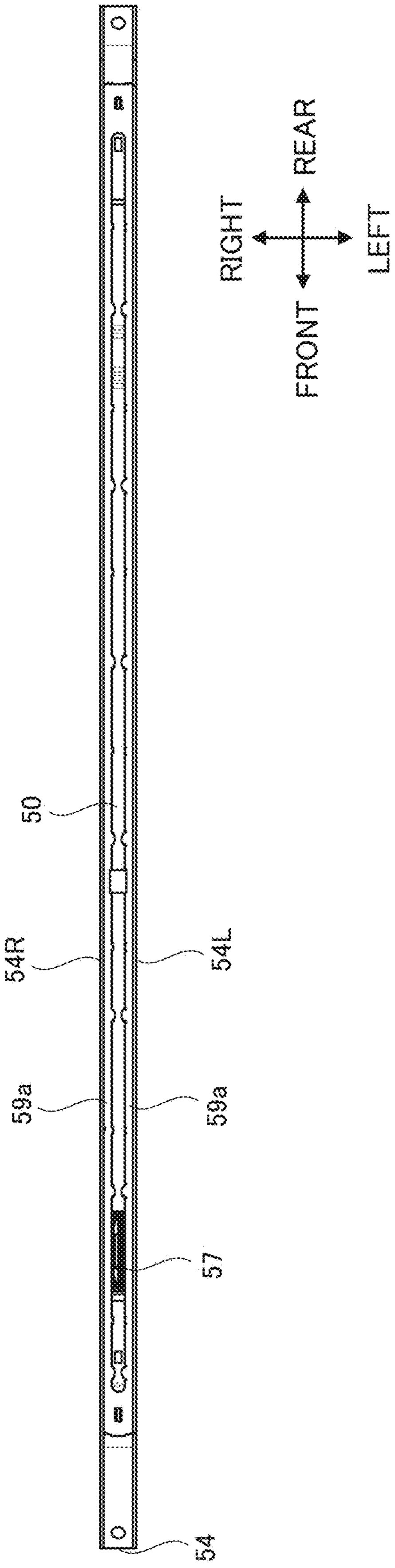
FIG. 13 is a bottom view illustrating the adhesion of the exposure substrate by the sealant.

Regarding the exposure casing 54 and the exposure substrate 50 adhered by the UV adhesive 77*c* and the thermosetting adhesive 77*a* as described above, a sealant is used to seal the gap between the exposure substrate 50 and the exposure casing 54, specifically the extended portions 54L and 54R, with respect to the sub-scanning direction. As illustrated in FIGS. 9, 12, and 13, a sealant 59*a* is disposed to cover the UV adhesive 77*c* and the thermosetting adhesive 77*a* at both end portions in the sub-scanning direction, i.e., right-left direction, across an entire area in the main scanning direction, i.e., front-rear direction.

In the present embodiment, a silicon-based moisture curing adhesive having a lower viscosity compared to the acrylic UV adhesive 77*c* and the epoxy-based thermosetting adhesive 77*a* is used as the sealant 59*a*. Since the sealant 59*a* has a low viscosity, it enters through the gap formed between the exposure substrate 50 and the exposure casing 54 along the cured shapes of the UV adhesive 77*c* and the thermosetting adhesive 77*a*, and may seal the gap. Further, since the sealant 59*a* is a moisture curing adhesive, it may cure easily in a normal temperature normal humidity environment without performing any special operation.

By sealing the gap between the exposure substrate 50 and the exposure casing 54 using the sealant 59*a* in the above-described manner, the LEDs 51 mounted on the exposure substrate 50 will not be easily soiled by toner and dust. The sealant 59*a* only seals the gap between the exposure substrate 50 and the exposure casing 54, and most of the exposure substrate 50 including the FFC connector 57 is exposed.

As described, in order to fix the substrate assembly 500 to the exposure casing 54, the exposure substrate 50 of the substrate assembly 500 is adhered to the exposure casing 54 by a plurality of adhesives. As the adhesives for adhering the exposure substrate 50, the UV adhesive 77*c* for pre-fixing the exposure substrate 50 to the exposure casing 54, the sealant 59*a* for sealing the gap between the exposure substrate 50 and the exposure casing 54, and the thermosetting adhesive 77*a* for permanently fixing the exposure substrate 50 to the exposure casing 54 are used. The UV adhesive 77*c* is disposed on a pre-fixing area other than the overlap area F where the LED chips and the LED chips respectively arranged in a staggered fashion on the exposure substrate 50 overlap. The sealant 59*a* is disposed across the entire area of the exposure substrate 50 in the main scanning direction including the overlap area F. The thermosetting adhesive 77*a* is disposed in the overlap area F where the LED chips and the LED chips respectively arranged in a staggered fashion on the exposure substrate 50 overlap. Since the thermal expansion coefficient of the thermosetting adhesive 77*a* is smaller than the thermal expansion coefficient of the sealant 59*a*, the volume change by heat of the thermosetting adhesive 77*a* is smaller than that of the sealant 59*a*. In the present embodiment, the thermosetting adhesive 77*a* is disposed in the overlap area F, which is especially influenced by the movement of the exposure substrate 50 and the twisting of the exposure substrate 50 due to the volume change of the adhesive when the exposure casing 54 rises in temperature, such that the deterioration of optical performance of the exposure head caused by adhesive is suppressed.

Regarding Adhesion of Lens Array

Next, the adhesion of the exposure casing 54 and the lens array 52 will be described based on FIGS. 14 to 20 with reference to FIG. 3. As described above, the lens array 52 is adhered to the exposure casing 54 by the adhesion portion 201 (refer to FIG. 3). It may be possible to adhere the lens array 52 to the exposure casing 54 at multiple locations of the lens array 52 in the longitudinal direction using a UV adhesive. Further, in order to seal the gap between the lens array 52 and the exposure casing 54, more specifically, the first opening 54*a* of the planar portion 54U, having been adhered using the UV adhesive, it may be possible to adhere almost the entire area of the lens array 52 in the longitudinal direction using a sealant having a lower viscosity compared to the UV adhesive.

As described above, the lens array 52 focuses the light emitted from the LEDs 51 on the surface of the photosensitive drum 2Y In order to do so, as illustrated in FIG. 3, the lens array 52 is positioned such that the distance between the LED chips 53, specifically the LEDs 51, mounted on the exposure substrate 50 and the lens array 52, specifically the light incident surface 52*b*, is set to a predetermined value. However, in a case where the exposure casing 54 rises in temperature by the heat generated by the circuit elements of the exposure substrate 50, dispersion of the volume changes of the adhesives may occur due to the difference between the thermal expansion coefficient of the UV adhesive used to adhere the lens array 52 and the exposure casing 54 and thermal expansion coefficient of the sealant. Hitherto, the distance between the LED chips 53 on the exposure substrate 50 and the lens array 52 may change by the lens array 52 moving in the sub-scanning direction or twisting in the up-down direction with respect to the exposure casing 54. Then, image defects such as unevenness of density may occur to the toner image formed on the recording material P.

Figure 14:
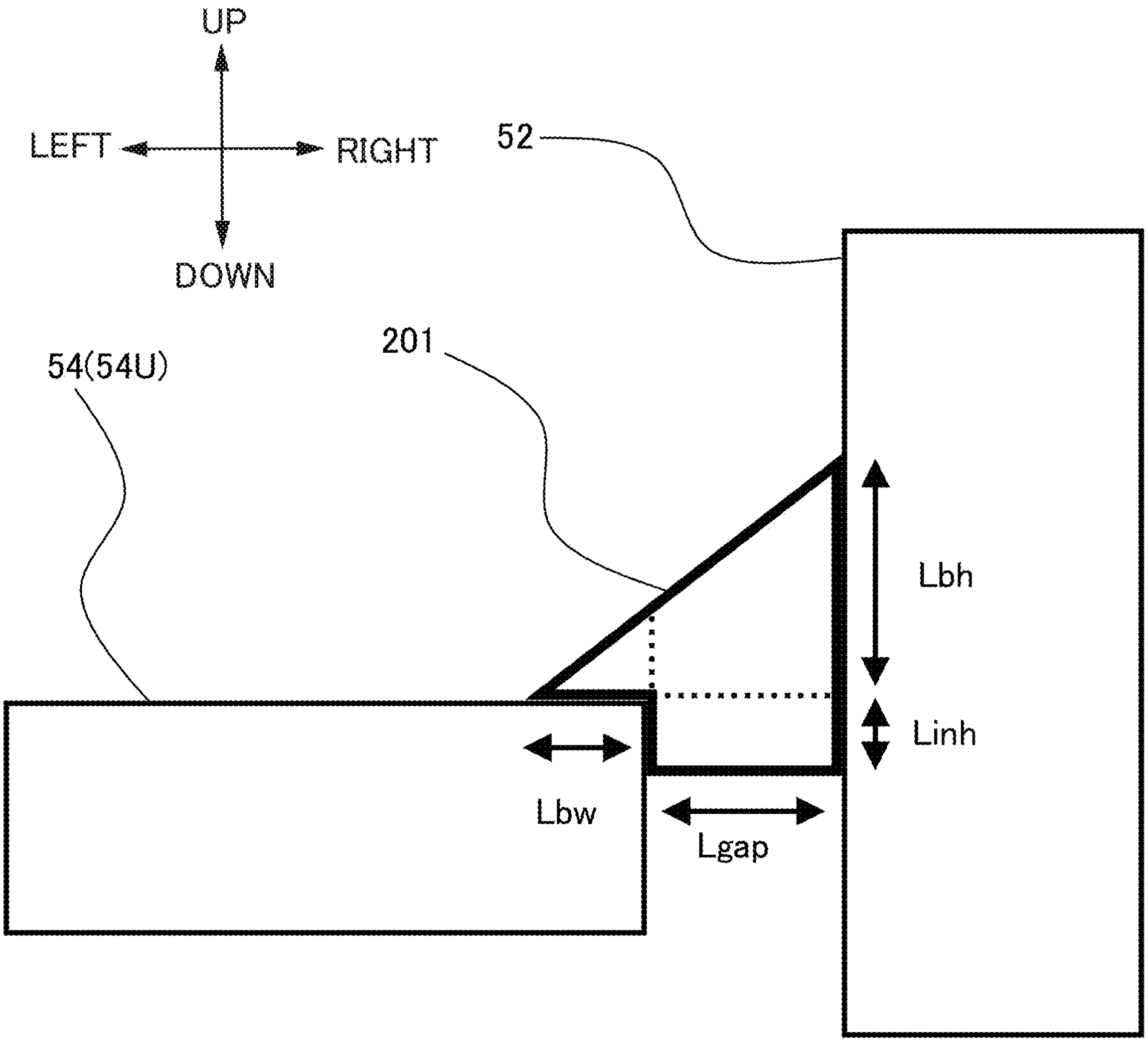
FIG. 14 is a view illustrating a physical model for simulating a contribution of movement and a contribution of twist with respect to an exposure casing of a lens array by an adhesive.
Figure 15A:
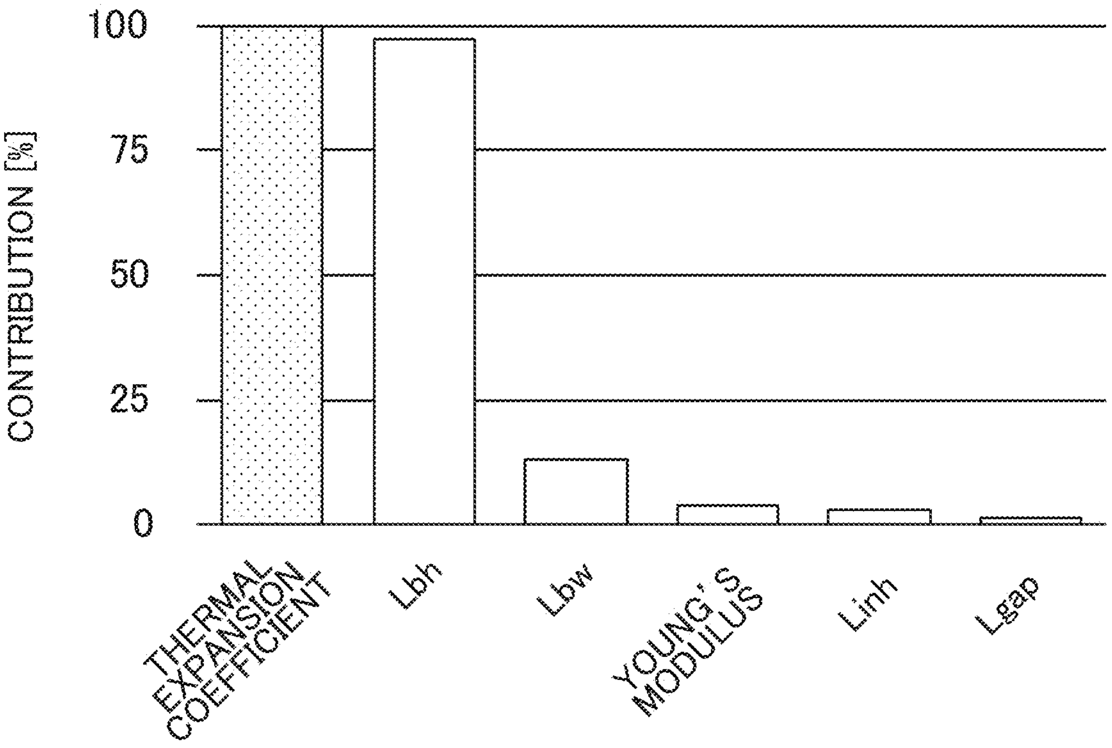
FIG. 15A is a graph showing the contribution of movement with respect to the exposure casing of the lens array.
Figure 15B:
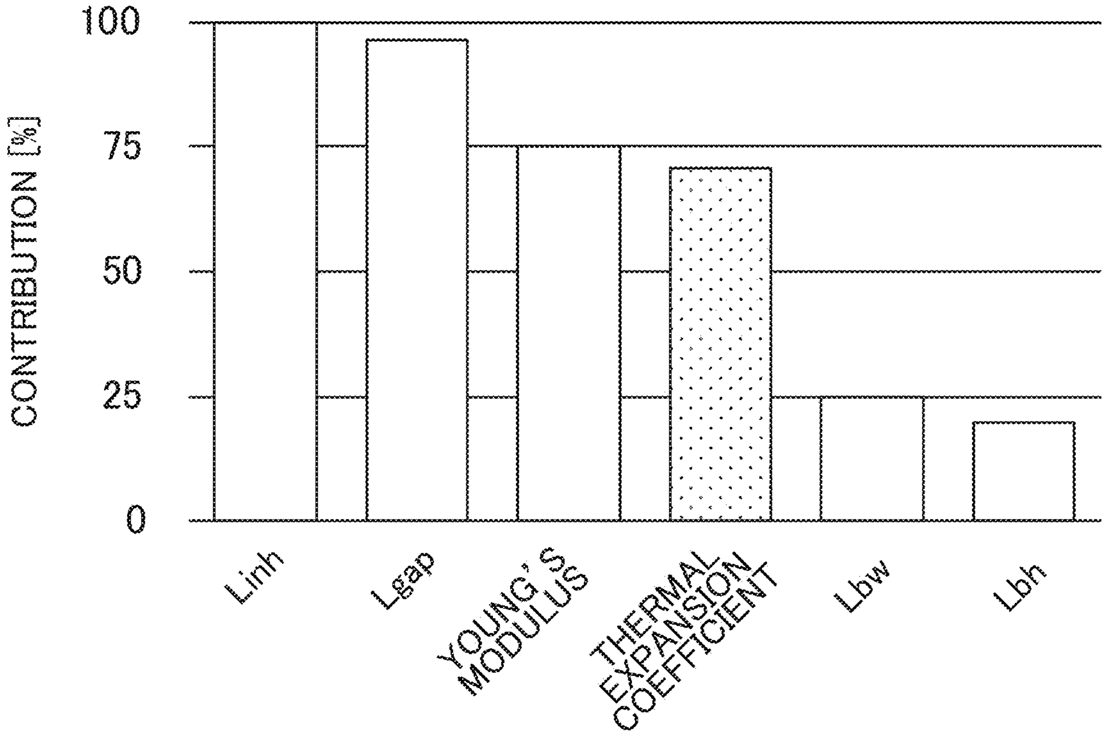
FIG. 15B is graph showing the contribution of twist with respect to the exposure casing of the lens array.

In consideration of the above-mentioned issue, the present inventors have simulated a contribution of movement of the lens array 52 and a contribution of twist of the lens array 52 with respect to the exposure casing 54 by the adhesive according to a physical model. FIG. 14 illustrates a physical model for simulating the contribution of movement of the lens array 52 and the contribution of twist of the lens array 52 with respect to the exposure casing 54 by the adhesive. In FIG. 14, "Lgap" is an index indicating a contribution of the adhesion portion 201 in the gap between the exposure casing 54, more specifically the planar portion 54U, and the lens array 52 regarding the sub-scanning direction, and "Lbw" is an index indicating a contribution of the adhesion portion 201 in an adhesion area of the exposure casing 54 regarding the sub-scanning direction. Further, "Linh" is an index indicating a contribution of the adhesion portion 201 at a portion where the exposure casing 54 and the lens array 52 are superposed in the up-down direction, and "Lbh" is an index indicating a contribution of the adhesion portion 201 in an adhesion area of the lens array 52 excluding the "Linh" in the up-down direction. The "thermal expansion coefficient" and the "Young's modulus, i.e., vertical elasticity" in FIGS. 15A and 15B are indexes indicating the characteristics of the adhesion portion 201. The adhesion portion 201 described here is composed of cured adhesive, and the concept of the adhesive mentioned here includes the filler described above.

FIG. 15A is a graph showing the contribution of movement of the lens array 52, and FIG. 15B is a graph showing the contribution of twist of the lens array 52. As illustrated in FIGS. 15A and 15B, according to the simulation result, regarding the contribution of movement of the lens array 52 and the contribution of twist of the lens array 52, it can be recognized that the contribution of the "thermal expansion coefficient" of the adhesion portion 201 is greater than the other indexes. Therefore, by using an adhesive having a smaller thermal expansion coefficient than the sealant, the movement of the lens array 52 and the twist of the lens array 52 caused by the volume change of the adhesive in a state where the exposure casing 54 rises in temperature may be suppressed.

Therefore, according to the present embodiment, in order to adhere the lens array 52, in addition to the UV adhesive and the sealant described above, a thermosetting adhesive that is cured by heat is used. In the present embodiment, a thermal expansion coefficient of the thermosetting adhesive is smaller than a thermal expansion coefficient of the sealant, and for example, it is "$3.0\times10^{-5}$/K" or more and "$6.0\times10^{-5}$/K" or less. In other words, the sealant has a greater thermal expansion coefficient than the thermosetting adhesive.

Figure 16:
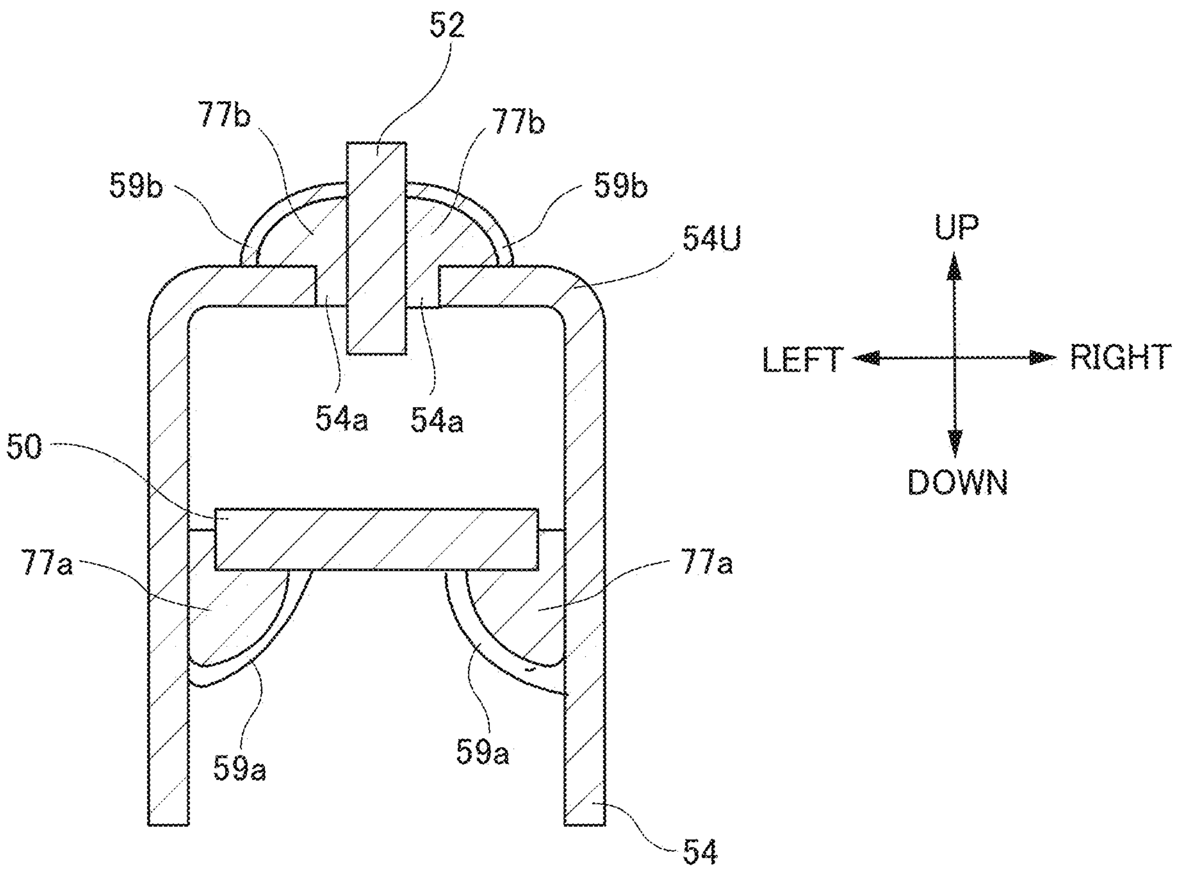
FIG. 16 is a schematic diagram illustrating an adhesion of the lens array and the exposure casing.

In the present embodiment, as illustrated in FIG. 16, in order to adhere the lens array 52 to the planar portion 54U of the exposure casing 54, a thermosetting adhesive 77*b* is used in specific areas of the lens array 52, as described in further detail below. The predetermined area of the lens array 52 refers to a plurality of permanent fixing areas, i.e., third areas, superposed with a plurality of overlap areas F (refer to FIG. 4C) of the exposure substrate 50 in the lens array 52 when viewed in the optical axis direction of the lens array 52.

Regarding Adhesion of Lens Array by UV Adhesive

The lens array 52 inserted through the first opening 54*a* to the exposure casing 54 is adhered by a UV adhesive to the planar portion 54U of the exposure casing 54 at both end portions thereof in the sub-scanning direction, i.e., right-left direction, by which the lens array 52 is pre-fixed to the exposure casing 54. In the present embodiment, an acrylic UV adhesive having a property to cure in a short time even under normal temperature by UV irradiation is used. By using the UV adhesive, the work time required to position the lens array 52 at a desired installation position with respect to the exposure casing 54 using a tool or the like to realize pre-fixing may be cut down.

The lens array 52 pre-fixed to the exposure casing 54 is adhered using the thermosetting adhesive 77*b* to the planar portion 54U of the exposure casing 54 at both end portions thereof in the sub-scanning direction by which the lens array 52 is permanently fixed to the exposure casing 54. According to the present embodiment, an epoxy-based thermosetting adhesive 77*b* is used. The thermosetting adhesive 77*b* is cured, for example, by heating for a few hours in an oven heated to 100° C.

Figure 17:
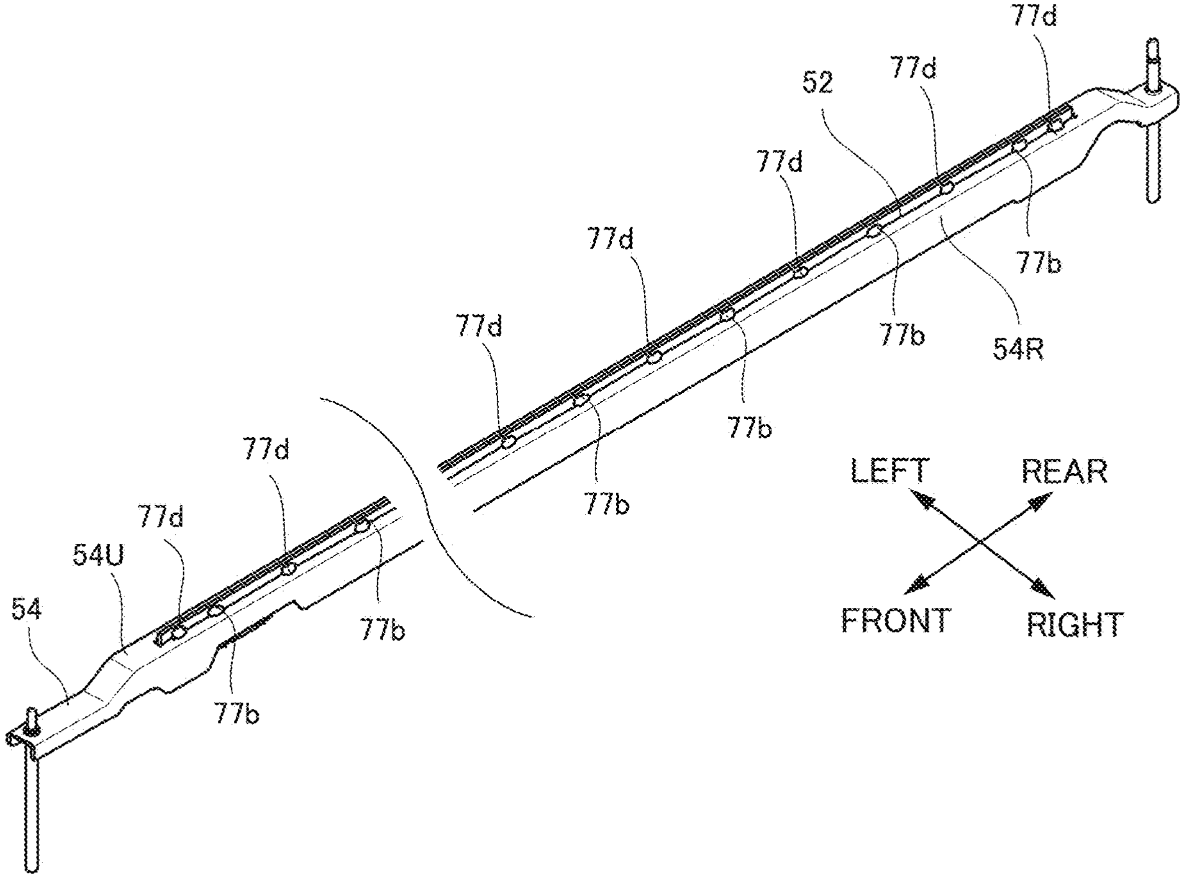
FIG. 17 is a perspective view illustrating the adhesion of the lens array by the UV adhesive and the thermosetting adhesive.
Figure 18:
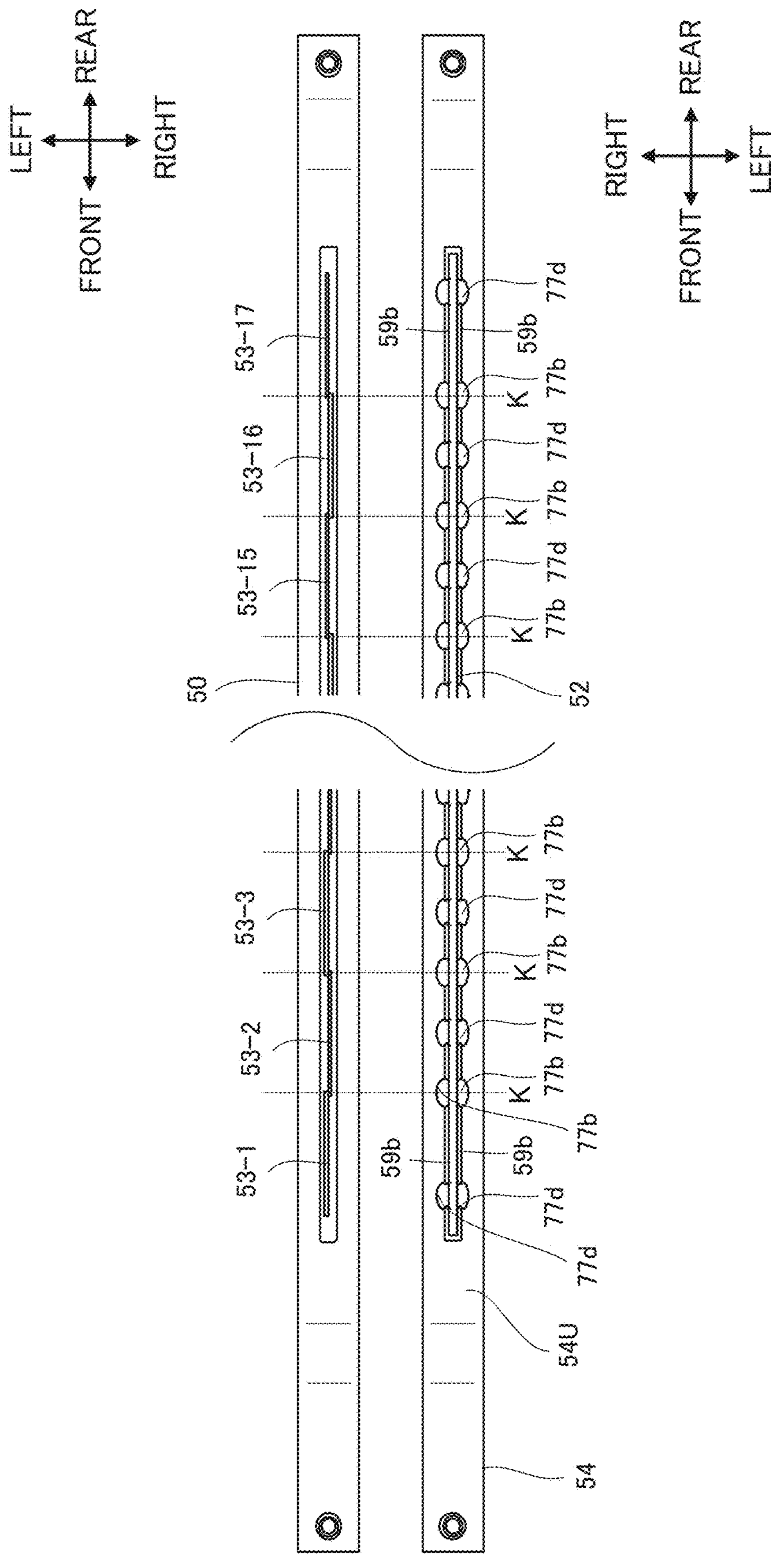
FIG. 18 is top view of the exposure substrate and a bottom view of a planar portion illustrating the adhesion of the lens array by the UV adhesive and the thermosetting adhesive.

As illustrated in FIGS. 17 and 18, an UV adhesive 77*d* and the thermosetting adhesive 77*b* adhere the lens array 52 at multiple locations with an interval therebetween in the main scanning direction, i.e., front-rear direction, at both end portions of the exposure substrate 50 in the sub-scanning direction, i.e., right-left direction. In FIG. 18, in order to facilitate understanding, the upper surface of the exposure substrate 50 and the rear surface of the planar portion 54U are illustrated.

In the present embodiment, the UV adhesive 77*d* is disposed at pre-fixing areas that are not superposed with the overlap areas F of the exposure substrate 50 when viewed in the optical axis direction, and adheres the lens array 52 to the exposure casing 54. The UV adhesive 77*d* is preferably disposed at locations superposed when viewed in the sub-scanning direction and at a pitch of approximately regular intervals in the main scanning direction. In order to suppress warping of the lens array 52, the UV adhesive 77*d* is preferably disposed at least at one location, preferably at three locations or more, in the main scanning direction.

In the example illustrated in FIG. 18, at a first end of the lens array 52 in the sub-scanning direction, in all the pre-fixing areas between the overlap area F and the overlap area F of the respective LED chips 53-1 to 53-17 when viewed in the optical axis direction, in other words, in 15 locations of all the pre-fixing areas superposed to the respective LED chips 53-2 to 53-16 excluding the overlap area F, the UV adhesive 77*d* is disposed at a pitch of approximately regular intervals. It is preferable that the UV adhesive 77*d* is arranged such that a center of each pre-fixing area is set as reference in the main scanning direction. In order to further suppress warping of the lens array 52, the UV adhesive 77*d* may be disposed at both end portions in the main scanning direction.

The thermal expansion coefficient of the UV adhesive 77*d* is smaller than the thermal expansion coefficient of the thermosetting adhesive 77*b*, and for example, smaller than "3.0×10−5/K". This is because when the thermosetting adhesive 77*b* is heated and cured, the lens array 52 that has been pre-fixed using the UV adhesive 77*d* must be prevented from moving with respect to the exposure casing 54.

Regarding Adhesion of Lens Array by Thermosetting Adhesive

Meanwhile, the thermosetting adhesive 77*b* constituting a fifth adhesion portion is disposed at the permanent fixing area of the lens array 52 to adhere the lens array 52 to the exposure casing 54. The thermosetting adhesive 77*b* is preferably disposed at locations superposed when viewed in the sub-scanning direction and at a pitch of approximately regular intervals in the main scanning direction. In order to suppress movement and twist of the lens array 52, the thermosetting adhesive 77*b* is preferably disposed at least at one location, preferably at three locations or more, among the plurality of the permanent fixing areas in the main scanning direction of the lens array 52.

In the example illustrated in FIG. 18, the thermosetting adhesives 77*b* are disposed at a pitch of approximately regular intervals at 16 locations of the permanent fixing area in all the overlap areas F of the LED chips 53-1 to 53-17 when viewed in the optical axis direction at the first end of the lens array 52 in the sub-scanning direction. In the example, the thermosetting adhesive 77*b* is disposed between the UV adhesive 77*d* and the UV adhesive 77*d*. The Young's modulus of the thermosetting adhesive 77*b* is greater than the Young's modulus of the UV adhesive 77*d* and the Young's modulus of the sealant, and it is "10000 MPa" or greater, for example. That is, the stiffness after curing of the thermosetting adhesive 77*b* is higher than the stiffness after curing of the UV adhesive 77*d* and the stiffness of the sealant. As illustrated in FIG. 18, the thermosetting adhesive 77*b* is preferably disposed with a center of the permanent fixing area, illustrated by a dotted line K, that is superposed with the overlap area F in the main scanning direction set as reference.

The thermosetting adhesive 77*b* is disposed so as to realize spot adhesion of the lens array 52 to the exposure casing 54 within the permanent fixing area superposed with the overlap area F. This is because the thermosetting adhesive 77*b* aims at fixing the lens array 52 and the exposure casing 54, and by spot adhesion, the lens array 52 and the exposure casing 54 may be fixed with sufficient strength. Thus, by performing spot adhesion of the thermosetting adhesive 77*b*, it becomes possible to reduce the amount of use of the thermosetting adhesive 77*b* instead of disposing the thermosetting adhesive 77*b* uniformly in the permanent fixing area, such that costs may be cut down.

Regarding Adhesion of Lens Array by Sealant

Figure 19:
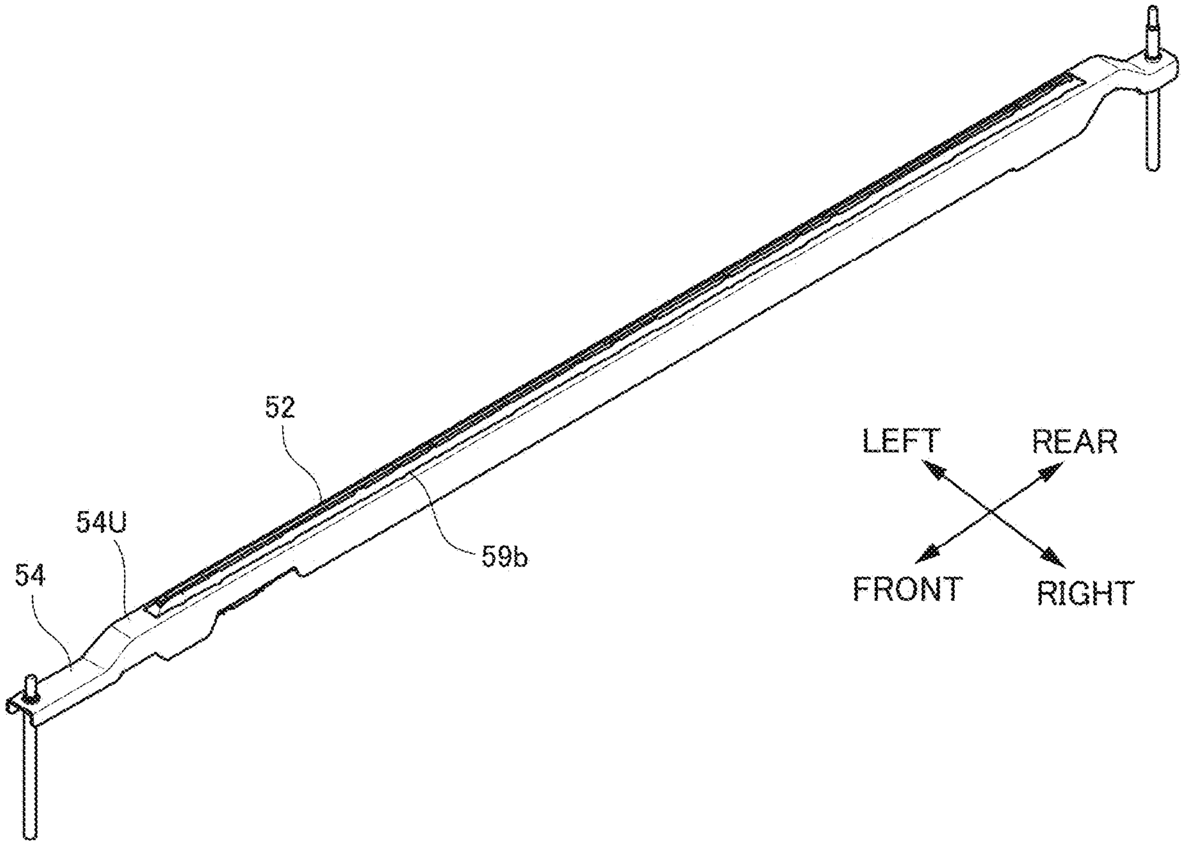
FIG. 19 is a perspective view illustrating the adhesion of the lens array by the sealant.
Figure 20:
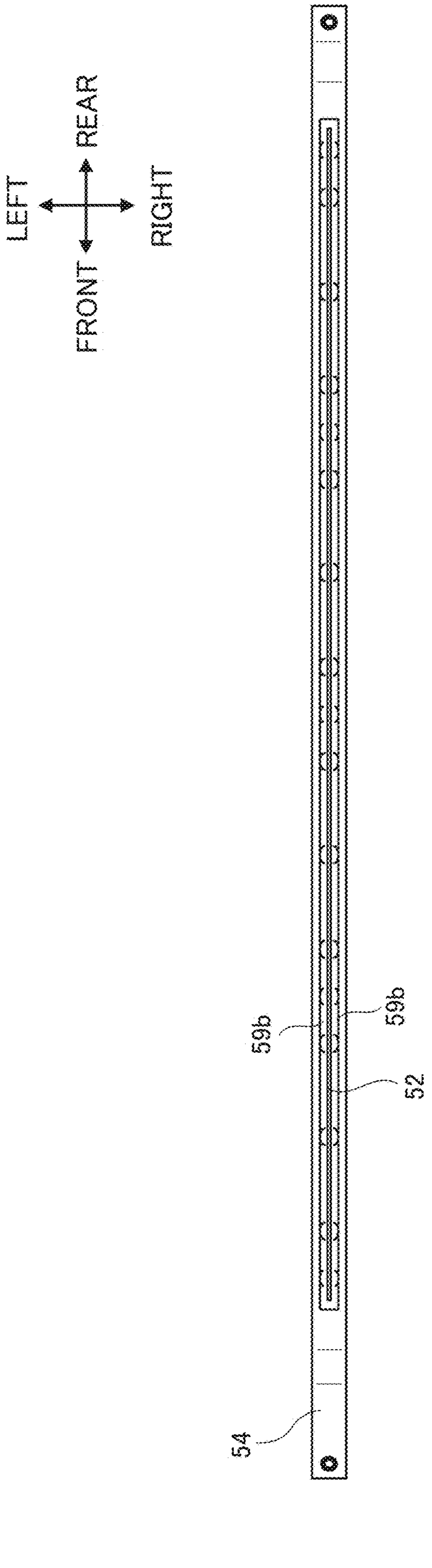
FIG. 20 is a bottom view illustrating the adhesion of the lens array by the sealant.

Regarding the exposure casing 54 and the lens array 52 adhered by the UV adhesive 77*d* and the thermosetting adhesive 77*b* as described above, a sealant is used to seal the gap between the lens array 52 and the exposure casing 54, specifically, the first opening 54*a* of the planar portion 54U, with respect to the sub-scanning direction. As illustrated in FIGS. 16, 19, and 20, a sealant 59*b* is disposed to cover the UV adhesive 77*d* and the thermosetting adhesive 77*b* at both end portions in the sub-scanning direction, i.e., right-left direction, across an entire area in the main scanning direction, i.e., front-rear direction.

In the present embodiment, a silicon-based moisture curing adhesive having a lower viscosity compared to the acrylic UV adhesive 77*d* and the epoxy-based thermosetting adhesive 77*b* is used as the sealant 59*b* constituting a fourth adhesion portion. Since the sealant 59*b* has a low viscosity, it enters through the gap formed between the lens array 52 and the exposure casing 54, i.e., the first opening 54*a* of the planar portion 54U, along the cured shapes of the UV adhesive 77*d* and the thermosetting adhesive 77*b*, and may seal the gap. Further, since the sealant 59*b* is a moisture curing adhesive, it may cure easily in a normal temperature normal humidity environment without performing any special operation. Thus, by sealing the gap between the lens array 52 and the exposure casing 54 by the sealant 59*b*, the lenses 521 of the lens array 52 will not be easily soiled by toner and dust.

As described, the lens array 52 is adhered to the exposure casing 54 by an adhesion portion composed of a plurality of types of adhesives. As the adhesives for adhering the lens array 52, the UV adhesive 77*d* for pre-fixing the lens array 52 to the exposure casing 54, the sealant 59*b* for sealing the gap between the lens array 52 and the exposure casing 54, and the thermosetting adhesive 77*b* for permanently fixing the lens array 52 to the exposure casing 54 are used. The UV adhesive 77*d* is disposed on a pre-fixing area in the lens array 52 that does not overlap with the overlap area F of the exposure substrate 50 when viewed in the optical axis direction. The sealant 59*a* is disposed across the entire area of the lens array 52 in the main scanning direction. The thermosetting adhesive 77*b* is disposed in the permanent fixing area superposed with the overlap area F of the exposure substrate 50 when viewed in the optical axis direction. Since the thermal expansion coefficient of the thermosetting adhesive 77*b* is smaller than the thermal expansion coefficient of the sealant 59*b*, the volume change by heat of the thermosetting adhesive 77*b* is smaller than that of the sealant 59*b*. In the lens array 52 of the present embodiment, the thermosetting adhesive 77*b* is disposed in the permanent fixing area superposed with the overlap area F, which is especially influenced by the movement of the exposure substrate 50 and the twisting of the exposure substrate 50 due to the volume change of the adhesive when the exposure casing 54 rises in temperature, such that the deterioration of optical performance of the exposure head 4Y caused by adhesive is suppressed.

OTHER EMBODIMENTS

In the embodiments described above, a “lower surface exposure system” in which the exposure heads 4Y to 4K are arranged below the photosensitive drums 2Y to 2K to expose the photosensitive drums 2Y to 2K from below was adopted as the exposure system (refer to FIG. 2), but the present technique is not limited thereto. The exposure system may be an “upper surface exposure system” in which the exposure heads 4Y to 4K are arranged above the photosensitive drums 2Y to 2K to expose the photosensitive drums 2Y to 2K from above.

The embodiments described above was described taking as an example an intermediate transfer-type image forming apparatus 100 in which toner images of respective colors are primarily transferred from the photosensitive drums 2Y to 2K of respective colors to the intermediate transfer belt 6, and then the toner images of respective colors are secondarily transferred to the recording material P, but the present technique is not limited thereto. For example, it may be possible to adopt a direct transfer-type image forming apparatus in which a toner image on the photosensitive drum is directly transferred to a recording material P conveyed on a conveyor belt having a nip portion formed between the belt and the photosensitive drum by applying voltage to a transfer roller arranged to face the photosensitive drum with the conveyor belt interposed therebetween.

While the present disclosure has been described with reference to embodiments, it is to be understood that the present disclosure is not limited to the disclosed embodiments. The scope of the following claims is to be accorded the broadest interpretation so as to encompass all such modifications and equivalent structures and functions.

This application claims the benefit of Japanese Patent Application No. 2024-086279, filed May 28, 2024, and Japanese Patent Application No. 2025-083648, filed May 19, 2025 which are hereby incorporated by reference herein in their entirety.

What is claimed is:

1. An exposure head comprising:

a substrate assembly including:

a first light emitting chip in which a plurality of light emitting elements are arranged in a main scanning direction;

a second light emitting chip in which a plurality of light emitting elements are arranged in the main scanning direction, the second light emitting chip being arranged to partially overlap with the first light emitting chip such that an end portion thereof in the main scanning direction overlaps with an end portion of the first light emitting chip in the main scanning direction when viewed in a sub-scanning direction; and a substrate on which the first light emitting chip and the second light emitting chip are mounted;

a lens array including a plurality of lenses configured to focus light emitted from the light emitting elements of the first light emitting chip and the second light emitting chip;

a retaining member configured to retain the substrate assembly and the lens array such that the lens array faces the light emitting elements; and a first adhesion portion, wherein, in a state where an area on the substrate where the end portion of the second light emitting chip in the main scanning direction and the end portion of the first light emitting chip in the main scanning direction overlap when viewed in the sub-scanning direction is referred to as a first area, the first adhesion portion is configured to adhere both end portions of the substrate assembly in the sub-scanning direction to the retaining member in the first area.

2. The exposure head according to claim 1, further comprising:

a second adhesion portion configured to adhere the both end portions of the substrate assembly in the sub-scanning direction to the retaining member, the second adhesion portion having a greater thermal expansion coefficient than that of the first adhesion portion.

3. The exposure head according to claim 2, wherein the second adhesion portion is a sealing member that is configured to seal a gap between the substrate and the retaining member, and that is disposed across an entire area of the both end portions of the substrate assembly in the sub-scanning direction.

4. The exposure head according to claim 3, wherein the sealing member is disposed to cover the first adhesion portion from above the first adhesion portion.

5. The exposure head according to claim 2, further comprising:

a third adhesion portion configured to adhere both end portions of the lens array in the sub-scanning direction to the retaining member at a position that differs from the first adhesion portion, wherein the third adhesion portion has a thermal expansion coefficient and a Young's modulus smaller than those of the first adhesion portion.

6. The exposure head according to claim 5, wherein the third adhesion portion is a cured photosetting adhesive cured by light.

7. The exposure head according to claim 1, wherein a light emitting element positioned in the first area among the plurality of light emitting elements of the first light emitting chip and a light emitting element positioned in the first area among the plurality of light emitting elements of the second light emitting chip are superposed when viewed in the sub-scanning direction.

8. The exposure head according to claim 1, wherein the first adhesion portion is a cured thermosetting adhesive cured by heat.

9. The exposure head according to claim 1, further comprising:

a fourth adhesion portion configured to adhere both end portions of the lens array in the sub-scanning direction to the retaining member; and a fifth adhesion portion configured to adhere the both end portions of the lens array in the sub-scanning direction to the retaining member, the fifth adhesion portion having a smaller thermal expansion coefficient than that of the fourth adhesion portion, wherein the fifth adhesion portion is disposed in a third area that is superposed with the first area in the lens array when viewed in an optical axis direction of the lens array.

10. The exposure head according to claim 1, wherein the retaining member includes a first retaining portion configured to retain the lens array, and a second retaining portion configured to retain the substrate assembly such that there is a distance between the lens array and the substrate assembly in an optical axis direction of the lens array.

11. The exposure head according to claim 1, wherein the first light emitting chip is one of a plurality of first light emitting chips that are arranged with a distance therebetween in the main scanning direction and constituting a first chip group, wherein the second light emitting chip is one of a plurality of second light emitting chips that are arranged with a distance therebetween in the main scanning direction and constituting a second chip group, wherein the substrate assembly includes a plurality of first areas in which end portions of the plurality of second light emitting chips in the main scanning direction and end portions of the plurality of first light emitting chips in the main scanning direction are overlapped when viewed in the sub-scanning direction, and wherein a plurality of first adhesion portions that adhere the substrate assembly to the retaining member are respectively disposed in the plurality of first areas, the first adhesion portion being one of the plurality of first adhesion portions.

12. An image forming apparatus comprising:

a photosensitive member;

the exposure head according to claim 1 configured to form an electrostatic latent image by exposing a surface of the photosensitive member;

a developing unit configured to develop the electrostatic latent image formed on the surface of the photosensitive member by toner; and a transfer portion configured to transfer a toner image formed on the surface of the photosensitive member onto a recording material.

* * * * *